(12) United States Patent
Iwama et al.

(10) Patent No.: US 9,984,822 B2
(45) Date of Patent: May 29, 2018

(54) ELECTRONIC COMPONENT

(71) Applicant: TDK CORPORATION, Tokyo (JP)

(72) Inventors: Masahiro Iwama, Nikaho (JP); Takehisa Tamura, Tokyo (JP); Atsushi Sato, Tokyo (JP); Tomonori Oi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days. days.

(21) Appl. No.: 15/270,744

(22) Filed: Sep. 20, 2016

(65) Prior Publication Data

US 2017/0092423 A1 Mar. 30, 2017

(30) Foreign Application Priority Data

Sep. 25, 2015 (JP) .................................. 2015-187826

(51) Int. Cl.
| | |
|---|---|
| *H01G 4/232* | (2006.01) |
| *H01G 4/30* | (2006.01) |
| *H01G 4/008* | (2006.01) |
| *H01G 4/248* | (2006.01) |
| *H01G 4/12* | (2006.01) |

(52) U.S. Cl.
CPC ............. *H01G 4/232* (2013.01); *H01G 4/008* (2013.01); *H01G 4/2325* (2013.01); *H01G 4/248* (2013.01); *H01G 4/30* (2013.01); *H01G 4/12* (2013.01)

(58) Field of Classification Search
None
See application file for complete search history.

(56) References Cited

U.S. PATENT DOCUMENTS

| | | | | |
|---|---|---|---|---|
| 2003/0189817 | A1* | 10/2003 | Yoshii ................... | H01C 1/144 361/773 |
| 2011/0149466 | A1* | 6/2011 | Hwang ................. | H01G 4/012 361/303 |
| 2011/0235234 | A1* | 9/2011 | Yamamoto ............ | H01G 4/232 361/321.1 |
| 2014/0131082 | A1* | 5/2014 | Ahn ...................... | H05K 3/3442 174/260 |
| 2014/0290998 | A1* | 10/2014 | Ahn ....................... | H01G 4/30 174/260 |

FOREIGN PATENT DOCUMENTS

| | | |
|---|---|---|
| CN | 1450574 A | 10/2003 |
| CN | 102103927 A | 6/2011 |
| CN | 102254679 A | 11/2011 |
| JP | H10-22160 A | 1/1998 |

* cited by examiner

Primary Examiner — Dion R Ferguson
(74) Attorney, Agent, or Firm — Oliff PLC

(57) ABSTRACT

An element body includes a first principal surface and a second principal surface opposing each other in a first direction. A first terminal electrode is disposed on the first principal surface side of the element body. A second terminal electrode is disposed on the second principal surface side of the element body. The first terminal electrode includes a first sintered metal layer formed on the first principal surface; and a first plating layer formed on the first sintered metal layer and including base metal. The second terminal electrode includes a second sintered metal layer formed on the second principal surface, a second plating layer formed on the second sintered metal layer and including base metal, and a solder layer formed on the second plating layer and including Sn and a metal having a higher melting point than the melting point of Sn.

7 Claims, 11 Drawing Sheets

ELECTRONIC COMPONENT

TECHNICAL FIELD

The present invention relates to an electronic component.

BACKGROUND

Japanese Unexamined Patent Publication No. H10-022160 discloses an electronic component including an element body having a first principal surface and a second principal surface opposing each other in a first direction, a first terminal electrode disposed on a first principal surface side of the element body, and a second terminal electrode disposed on a second principal surface side of the element body. The first terminal electrode is connected to an electrode disposed on an electronic device (for example, circuit board or electronic component) by wire bonding. The first terminal electrode is connected to the electrode disposed on the electronic device through wire. The second terminal electrode is directly connected to another electrode disposed on the electronic device.

SUMMARY

An object of one aspect of the present invention is to provide an electronic component to which wire bonding mounting using wire including base metal (for example, Al or Cu) is possible on the first principal surface side, and to which solder mounting is possible on the second principal surface side.

An electronic component according to one aspect of the present invention includes an element body having a first principal surface and a second principal surface opposing each other in a first direction, a first terminal electrode disposed on the first principal surface side of the element body, and a second terminal electrode disposed on the second principal surface side of the element body. The first terminal electrode includes a first sintered metal layer formed on the first principal surface and a first plating layer formed on the first sintered metal layer. The first plating layer includes the base metal. The second terminal electrode includes a second sintered metal layer formed on the second principal surface, a second plating layer formed on the second sintered metal layer, and a solder layer formed on the second plating layer. The second plating layer includes the base metal. The solder layer includes Sn, and a metal having a higher melting point than the melting point of Sn.

In the electronic component according to the one aspect, since the first terminal electrode disposed on the first principal surface side of the element body includes the first plating layer, the wire bonding mounting using the wire including the base metal is possible on the first principal surface side. The wire bonding mounting using the wire including the base metal is less expensive than the wire bonding mounting using wire including Au.

In the electronic component according to the one aspect, since the second terminal electrode disposed on the second principal surface side of the element body includes the solder layer, the solder mounting is possible on the second principal surface side. Since the second terminal electrode includes the second plating layer, bonding strength between the second plating layer and the solder layer is improved.

In the electronic component according to the one aspect, the first plating layer is formed on the first sintered metal layer formed on the first principal surface of the element body, and the second plating layer is formed on the second sintered metal layer formed on the second principal surface of the element body. For this reason, when the first plating layer is formed, infiltration of a plating solution into the element body is suppressed by the first sintered metal layer, and when the second plating layer is formed, infiltration of a plating solution into the element body is suppressed by the second sintered metal layer. The infiltration of the plating solution may deteriorate electrical characteristics of the electronic component. Therefore, the infiltration of the plating solution is suppressed, so that deterioration of the electrical characteristics of the electronic component is suppressed.

The first plating layer may be a Ni plating layer or a Cu plating layer. In this case, the wire including Al or Cu is easily bonded to the first plating layer.

A depression may be formed in an inner area when viewed from a direction perpendicular to the second principal surface, on an electrode structure including the second sintered metal layer and the second plating layer. In this case, the solder layer may be formed convexly on the depression. In this embodiment, an amount of solder configuring the solder layer is greater in comparison with, for example, a configuration in which the depression is not formed in the electrode structure. For this reason, when the electronic component is solder-mounted to the electronic device on the second principal surface side, generation of a void in the solder is suppressed. As a result, bonding strength between the electronic component and the electronic device is improved.

The metal having the higher melting point than the melting point of Sn may be Sb. The solder layer including Sb as the metal having the higher melting point than the melting point of Sn is less expensive than the solder layer including a precious metal as the metal having the higher melting point than the melting point of Sn. For this reason, cost of the electronic component is reduced.

The second plating layer may be a Ni plating layer. In this case, there may be an area in which an alloy of Ni and Sn exists, between the second plating layer and the solder layer. Because of the area in which the alloy of Ni and Sn exists, bonding strength between the Ni plating layer and the solder layer is improved.

The electronic component according to the one aspect may further include a plurality of internal electrodes. In this case, the electronic component of this embodiment may include the following configuration. The plurality of internal electrodes is arranged at equal intervals in a second direction perpendicular to the first direction to oppose each other, inside the element body. In this case, the plurality of internal electrodes includes a plurality of first internal electrodes connected to the first terminal electrode and not connected to the second terminal electrode, a plurality of second internal electrodes connected to the second terminal electrode and not connected to the first terminal electrode, a plurality of third internal electrodes not connected to at least the second terminal electrode, and a plurality of fourth internal electrodes not connected to at least the first terminal electrode. The element body includes a plurality of first areas, each of which is positioned between each of the first internal electrodes and each of the second internal electrodes opposing each other, and a plurality of second areas, each of which is positioned between the first internal electrodes opposing each other via each of the third internal electrodes and between the second internal electrodes opposing each other via each of the fourth internal electrodes. Each of the first areas and each of the second areas are positioned alternately in the second direction.

In this embodiment, the electronic component functions as a multilayer capacitor.

The first internal electrodes connected to the first terminal electrode and the second internal electrodes connected to the second terminal electrode have different polarities from each other. The first areas, each of which is positioned between the first and second internal electrodes opposing each other, generates capacitance. The first internal electrodes have the same polarity to each other. The third internal electrodes not connected to the second terminal electrode do not have a different polarity from a polarity of the first internal electrodes at least. The second internal electrodes have the same polarity to each other. The fourth internal electrodes not connected to the first terminal electrode do not have a different polarity from a polarity of the second internal electrodes at least. Therefore, each of the second areas positioned between the first internal electrodes opposing each other via each of the third internal electrodes, and each of the second areas positioned between the second internal electrodes opposing each other via each of the fourth internal electrodes do not generate capacitance.

The element body includes an internal electrode disposition area in which the plurality of internal electrodes is disposed, and a pair of internal electrode non-disposition areas in which the plurality of internal electrodes is not disposed. The pair of internal electrode non-disposition areas sandwiches the internal electrode disposition area in the second direction. The internal electrode disposition area includes the plurality of first areas that generates capacitance, and the plurality of second areas that does not generate capacitance. Therefore, in the multilayer capacitor of this embodiment, a desired capacitance is secured by the plurality of first areas.

The second areas that do not generate capacitance are included in the internal electrode disposition area. For this reason, in the multilayer capacitor of this embodiment, the internal electrode disposition area is wider, and the internal electrode non-disposition area is narrower, in comparison with the following multilayer capacitor to be compared. In the multilayer capacitor to be compared, the internal electrodes having different polarities are disposed alternately, and size and capacitance of the element body are the same as those of the multilayer capacitor of this embodiment.

In the multilayer capacitor, in general, the element body is configured as a sintered body of a dielectric ceramic material, and each of the internal electrodes is configured as a sintered body of a metal material. A degree of sintering of the dielectric ceramic material in the internal electrode disposition area and a degree of sintering of the dielectric ceramic material in the internal electrode non-disposition area are different from each other due to presence/absence of the metal material to be the internal electrodes. For example, the degree of sintering of the dielectric ceramic material in the internal electrode non-disposition area is lower than the degree of sintering of the dielectric ceramic material in the internal electrode disposition area. In a case in which the degree of sintering of the dielectric ceramic material in the internal electrode disposition area and the degree of sintering of the dielectric ceramic material in the internal electrode non-disposition area are different from each other, a crack may be generated in the element body.

In the internal electrode disposition area, all internal electrodes are arranged at equal intervals in the second direction. For this reason, in the internal electrode disposition area, the degree of sintering of the dielectric ceramic is substantially uniform. In the multilayer capacitor of this embodiment, the internal electrode disposition area is wider than that of the multilayer capacitor to be compared, that is, the area is wider in which the degree of sintering of the dielectric ceramic is substantially uniform, so that the degree of sintering of the dielectric ceramic in the entire of the element body is stabilized. As a result, generation of the crack in the element body is suppressed.

In a case in which voltage is applied to the multilayer capacitor, mechanical strain of a size depending on the applied voltage is generated due to electrostrictive effect in the element body. Since stress is generated in the element body by the mechanical strain due to the electrostrictive effect, a crack may be generated in the element body.

Although the mechanical strain due to the electrostrictive effect is generated in the first areas, the mechanical strain due to the electrostrictive effect is not generated in the second areas. The first areas and the second areas are positioned alternately in the second direction. Therefore, in the multilayer capacitor of this embodiment, in comparison with the multilayer capacitor in which the internal electrode disposition area does not include the second areas, the areas in which the mechanical strain due to the electrostrictive effect is generated are distributed in the internal electrode disposition area. Thus, concentration of the stress is suppressed that is generated by the mechanical strain due to the electrostrictive effect. As a result, generation of the crack in the element body is suppressed.

From these things, in the multilayer capacitor of this embodiment, generation of the crack is suppressed while the desired capacitance is secured.

The electronic component according to the one aspect may further include a plurality of first internal electrode groups, a plurality of second internal electrode groups, a plurality of third internal electrode groups, and a plurality of fourth internal electrode groups. In this case, the electronic component of this embodiment may include the following configuration. Each of the first internal electrode groups includes a first number of the first internal electrodes. The first number of the first internal electrodes are connected to the first terminal electrode, and are arranged in the second direction perpendicular to the first direction inside the element body. Each of the second internal electrode groups includes the first number of the second internal electrodes. The first number of the second internal electrodes are connected to the second terminal electrode, and are arranged in the second direction inside the element body. Each of the third internal electrode groups includes a second number of the first internal electrodes. The second number of the first internal electrodes are connected to the first terminal electrode, and are arranged in the second direction inside the element body. Each of the fourth internal electrode groups includes the second number of the second internal electrodes. The second number of the second internal electrode are connected to the second terminal electrode, and are arranged in the second direction inside the element body. The first number and the second number are integers of two or greater that are different from each other. The element body includes an inner portion, and a pair of outer portions positioned to sandwich the inner portion in the second direction. An interval in the second direction between first internal electrodes included in each of the first internal electrode groups, an interval in the second direction between the second internal electrodes included in each of the second internal electrode groups, an interval in the second direction between each of the first internal electrodes included in each of the first internal electrode groups and each of the second internal electrodes included in each of the second internal electrode groups, an interval in the second direction between the first internal electrodes included in each of the third internal electrode groups, an interval in the second direction between the second internal electrodes included in each of the fourth internal electrode groups, and an interval in the second direction between each of the first internal electrodes included in each of the third internal electrode groups and each of the second internal electrodes included in each of the fourth internal electrode groups are equivalent to each other. Each of the first internal electrode groups and each of the second internal electrode groups are positioned in the pair of outer portions, and are arranged alternately in the second direction in such a manner that one first internal electrode of the first number of the first internal electrodes included in each of the first internal electrode groups and one second internal electrode of the first number of the second internal electrodes included in each of the second internal electrode groups oppose each other in the second direction. Each of the third internal electrode groups and each of the fourth internal electrode groups are positioned in the inner portion, and are arranged alternately in the second direction in such a manner that one first internal electrode of the second number of the first internal electrodes included in each of the third internal electrode groups and one second internal electrode of the second number of second internal electrodes included in each of the fourth internal electrode groups oppose each other in the second direction.

In this embodiment, the electronic component functions as a multilayer capacitor.

The plurality of first internal electrode groups and the plurality of second internal electrode groups are arranged alternately in the second direction. The one first internal electrode of the first number of the first internal electrodes included in each of the first internal electrode groups and the one second internal electrode of the first number of the second internal electrodes included in each of the second internal electrode groups oppose each other in the second direction. Thus, a plurality of areas that generates capacitance is disposed in each of the outer portions.

Since the first number of the first internal electrodes included in each of the first internal electrode groups all have the same polarity, in each of the first internal electrode groups, an area between the first internal electrodes respectively positioned at both ends in the second direction of the first number of the first internal electrodes does not generate capacitance. Since the first number of the second internal electrodes included in each of the second internal electrode groups all have the same polarity, in each of the second internal electrode groups, an area between the second internal electrodes respectively positioned at both ends in the second direction of the first number of the second internal electrodes does not generate capacitance. For this reason, in each of the outer portions of the element body, the areas that generate capacitance and the areas that do not generate capacitance are positioned alternately in the second direction.

The plurality of third internal electrode groups and the plurality of fourth internal electrode groups are arranged alternately in the second direction. The one first internal electrode of the second number of the first internal electrodes included in each of the third internal electrode groups and the one second internal electrode of the second number of the second internal electrodes included in each of the fourth internal electrode groups oppose each other in the second direction. Thus, a plurality of areas that generates capacitance is disposed in the inner portion.

Since the second number of the first internal electrodes included in each of the third internal electrode groups all have the same polarity, in each of the third internal electrode groups, an area between the first internal electrodes respectively positioned at both ends in the second direction of the second number of the first internal electrodes does not generate capacitance. Since the second number of the second internal electrodes included in each of the fourth internal electrode groups all have the same polarity, in each of the fourth internal electrode group, an area between the second internal electrodes respectively positioned at both ends in the second direction of the second number of the first internal electrodes does not generate capacitance. For this reason, in the inner portion of the element body, the areas that generate capacitance and the areas that do not generate the capacitance are positioned alternately in the second direction.

The element body includes the internal electrode disposition area in which the plurality of first-fourth internal electrode groups are disposed, and the pair of internal electrode non-disposition areas in which the plurality of first-fourth internal electrode groups are not disposed. The pair of internal electrode non-disposition areas sandwiches the internal electrode disposition area in the second direction. The internal electrode disposition area includes the plurality of areas that generates capacitance, and the plurality of areas that does not generate capacitance. Therefore, in the multilayer capacitor of this embodiment, the desired capacitance is secured by the plurality of areas that generates capacitance.

The plurality of areas that does not generate capacitance is included in the internal electrode disposition area. For this reason, in the multilayer capacitor of this embodiment, the internal electrode disposition area is wider, and the internal electrode non-disposition area is narrower, in comparison with the following multilayer capacitor to be compared. In the multilayer capacitor to be compared, the internal electrodes having different polarities are disposed alternately, and size and capacitance of the element body are the same as those of the multilayer capacitor of this embodiment.

In the internal electrode disposition area, all internal electrodes are arranged at equal intervals in the second direction. For this reason, in the internal electrode disposition area, the degree of sintering of the dielectric ceramic is substantially uniform. In the multilayer capacitor of this embodiment, the internal electrode disposition area is wider than that of the multilayer capacitor to be compared, that is, the area is wider in which the degree of sintering of the dielectric ceramic is substantially uniform, so that the degree of sintering of the dielectric ceramic in the entire of the element body is stabilized. As a result, generation of the crack in the element body is suppressed.

From these things, in the multilayer capacitor of this embodiment, generation of the crack is suppressed while the desired capacitance is secured. In this case, the first number may be greater than the second number.

In a case in which the first number is greater than the second number, the number of the first internal electrodes included in the first internal electrode groups positioned in the outer portions, and the number of the second internal electrodes included in the second internal electrode groups also positioned in the outer portions are greater than the number of the first internal electrodes included in the third internal electrode groups positioned in the inner portion, and the number of second internal electrodes included in the fourth internal electrode group also positioned in the inner portion. For this reason, in a case in which a crack is generated in the outer portions, the crack hardly reaches the first and second internal electrodes that have different polarities from each other and contribute capacitance.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION

Figure 1:
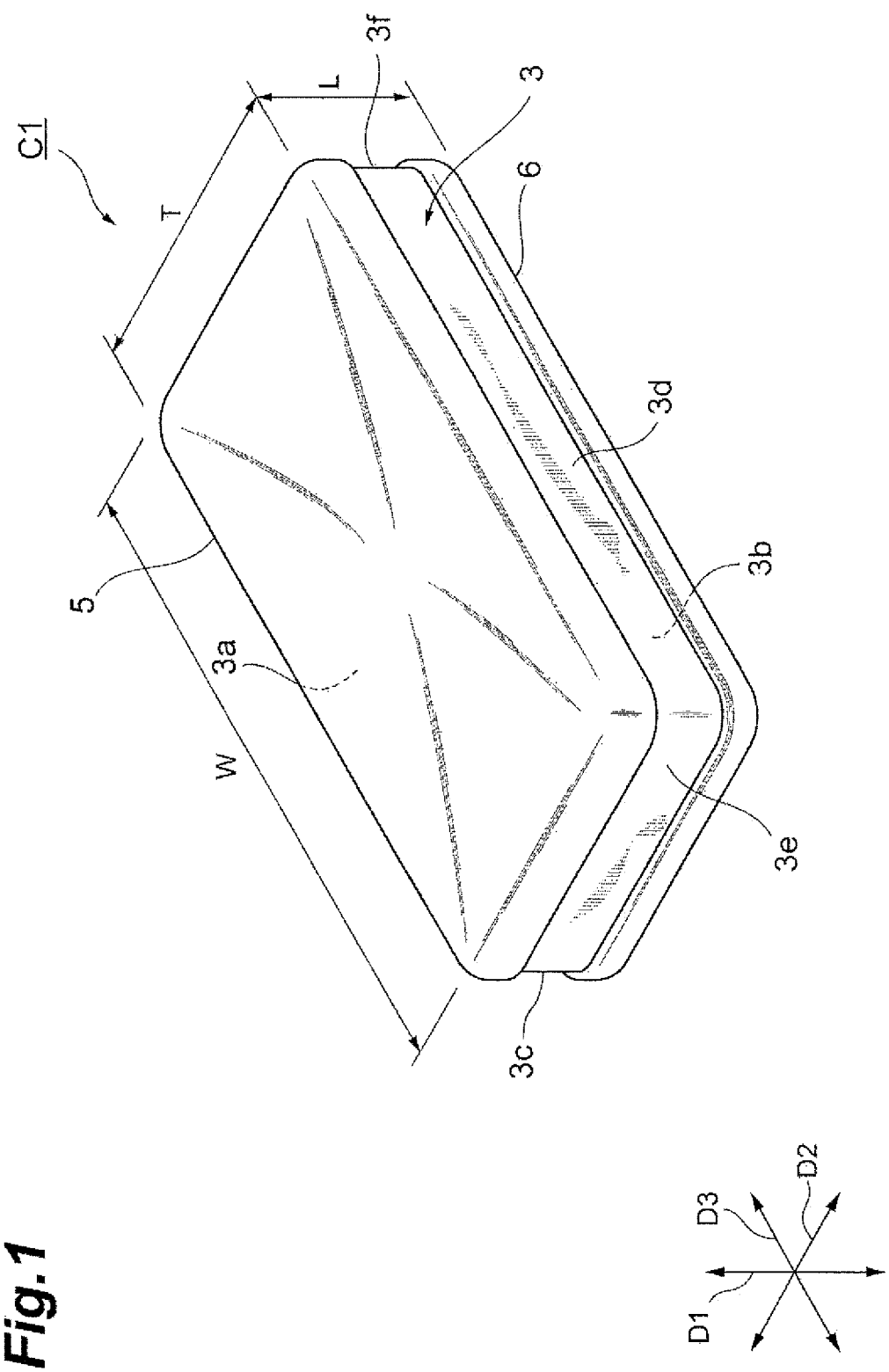
FIG. 1 is a perspective view illustrating a multilayer ceramic capacitor according to an embodiment.
Figure 2:
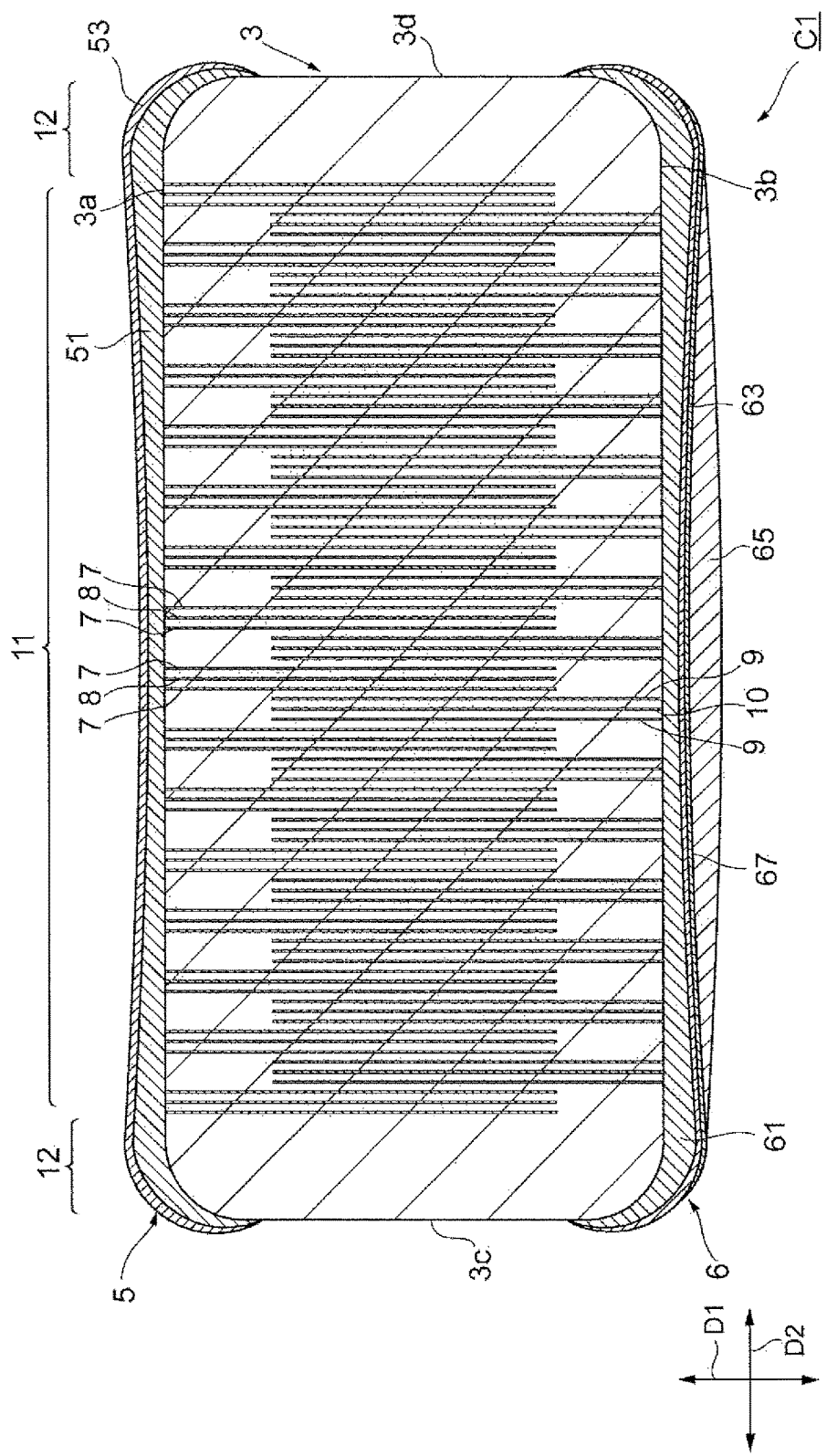
FIG. 2 is a diagram for describing a cross-sectional configuration of the multilayer ceramic capacitor according to the embodiment.

Hereinafter, an embodiment of the present invention is described in detail with reference to accompanying drawings. Incidentally, in the description, the same reference numerals are used for the same components or components having the same function, and redundant descriptions are omitted.

First, a configuration is described of a multilayer ceramic capacitor C1 according to the embodiment, with reference to FIG. 1 to FIG. 5. FIG. 1 is a perspective view illustrating a multilayer ceramic capacitor according to the embodiment. FIG. 2 to FIG. 5 are diagrams for describing a cross-sectional configuration of the multilayer ceramic capacitor according to the embodiment. In the embodiment, the multilayer ceramic capacitor C1 is described as an example of an electronic component.

As illustrated in FIG. 1 to FIG. 5, the multilayer ceramic capacitor C1 includes an element body 3, a first terminal electrode 5 and a second terminal electrode 6 disposed on an outer surface of the element body 3, and a plurality of internal electrodes 7, 8, 9, 10 disposed in the element body 3. The first terminal electrode 5 and the second terminal electrode 6 are separated.

The element body 3 has a rectangular parallelepiped shape. The element body 3 has a first principal surface 3a and a second principal surface 3b opposing each other, a first side surface 3c and a second side surface 3d opposing each other, and a third side surface 3e and a fourth side surface 3f opposing each other, as outer surfaces of the element body 3. The rectangular parallelepiped shape includes a shape of a rectangular parallelepiped in which corner portions and ridge portions are chamfered, and a shape of a rectangular parallelepiped in which corner portions and ridge portions are rounded.

A length T of the element body 3 in a direction (second direction D2) in which the first side surface 3c and the second side surface 3d oppose each other is greater than a length L of the element body 3 in a direction (first direction D1) in which the first principal surface 3a and the second principal surface 3b oppose each other. The length T of the element body 3 is equal to or less than a length W of the element body 3 in a direction (third direction D3) in which the third side surface 3e and the fourth side surface 3f oppose each other.

The first side surface 3c and the second side surface 3d extend in the first direction D1 to connect between the first principal surface 3a and the second principal surface 3b. The first side surface 3c and the second side surface 3d extend also in the third direction D3. The third side surface 3e and the fourth side surface 3f extend in the first direction D1 to connect between the first principal surface 3a and the second principal surface 3b. The third side surface 3e and the fourth side surface 3f extend also in the second direction D2.

The element body 3 is configured by stacking a plurality of dielectric layers in the direction (second direction D2) in which the first side surface 3c and the second side surface 3d oppose each other. In the element body 3, the direction in which the plurality of dielectric layers is stacked coincides with the second direction D2. Each of the dielectric layers is configured from, for example, a sintered body of a ceramic green sheet including a dielectric material (dielectric ceramic material such as $BaTiO_3$-based, $Ba(Ti, Zr)O_3$-based, or $(Ba, Ca)TiO_3$-based). In the actual element body 3, the dielectric layers are integrated so that the boundary is not visible between the dielectric layers.

The element body 3 includes an inner layer portion 11 and a pair of outer layer portions 12. In the inner layer portion 11, a plurality of internal electrodes 7, 8, 9, 10 is positioned. The pair of outer layer portions 12 is positioned to sandwich the inner layer portion 11 in the second direction D2. In the pair of outer layer portions 12, the plurality of internal electrodes 7, 8, 9, 10 is not positioned. In the embodiment, in the second direction D2, a ratio of the length of each of the outer layer portions 12 to the length T of the element body 3 is 0.05-0.2 (5-20%).

The first terminal electrode 5 is disposed on the first principal surface 3a side. The first terminal electrode 5 is formed to cover the first principal surface 3a, an edge portion of the first side surface 3c, an edge portion of the second side surface 3d, an edge portion of the third side surface 3e, and an edge portion of the fourth side surface 3f. The first terminal electrode 5 includes an electrode portion positioned on the first principal surface 3a, an electrode portion positioned on a portion of the first side surface 3c, an electrode portion positioned on a portion of the second side surface 3d, an electrode portion positioned on a portion of the third side surface 3e, and an electrode portion positioned on a portion of the fourth side surface 3f.

The second terminal electrode 6 is disposed on the second principal surface 3b side. The second terminal electrode 6 is formed to cover the second principal surface 3b, an edge portion of the first side surface 3c, an edge portion of the second side surface 3d, an edge portion of the third side surface 3e, and an edge portion of the fourth side surface 3f. The second terminal electrode 6 includes an electrode portion positioned on the second principal surface 3b, an electrode portion positioned on a portion of the first side surface 3c, an electrode portion positioned on a portion of the second side surface 3d, an electrode portion positioned on a portion of the third side surface 3e, and an electrode portion positioned on a portion of the fourth side surface 3f.

The first terminal electrode 5 includes a first sintered metal layer 51 and a first plating layer 53. The first plating layer 53 is the outermost layer of the first terminal electrode 5.

The first sintered metal layer 51 is formed on the first principal surface 3a, the edge portion of the first side surface 3c, the edge portion of the second side surface 3d, the edge portion of the third side surface 3e, and the edge portion of the fourth side surface 3f. The first sintered metal layer 51 is formed by, for example, applying conductive paste to the outer surface of the element body 3, and sintering the applied conductive paste. The first sintered metal layer 51 is a layer formed by sintering a metal component (metal powder) included in the conductive paste. The conductive paste is applied by using a printing method, for example.

In the embodiment, the first sintered metal layer 51 is a sintered metal layer including base metal. Specifically, the first sintered metal layer 51 is a sintered metal layer including Cu. The first sintered metal layer 51 may be a sintered metal layer including Ni. Thus, the first sintered metal layer 51 includes the base metal (such as Cu or Ni). In the conductive paste, for example, metal powder including the base metal, a glass component, an organic binder, and an organic solvent are mixed.

The first plating layer 53 is formed on the first sintered metal layer 51, and includes the base metal. The first plating layer 53 is formed by using a plating method. The first plating layer 53 is disposed on the first sintered metal layer 51. In the embodiment, the first plating layer 53 is a Ni plating layer formed by Ni plating on the first sintered metal layer 51. The first plating layer 53 may be a Cu plating layer. Thus, the first plating layer 53 includes Ni or Cu as the base metal.

Figure 6:
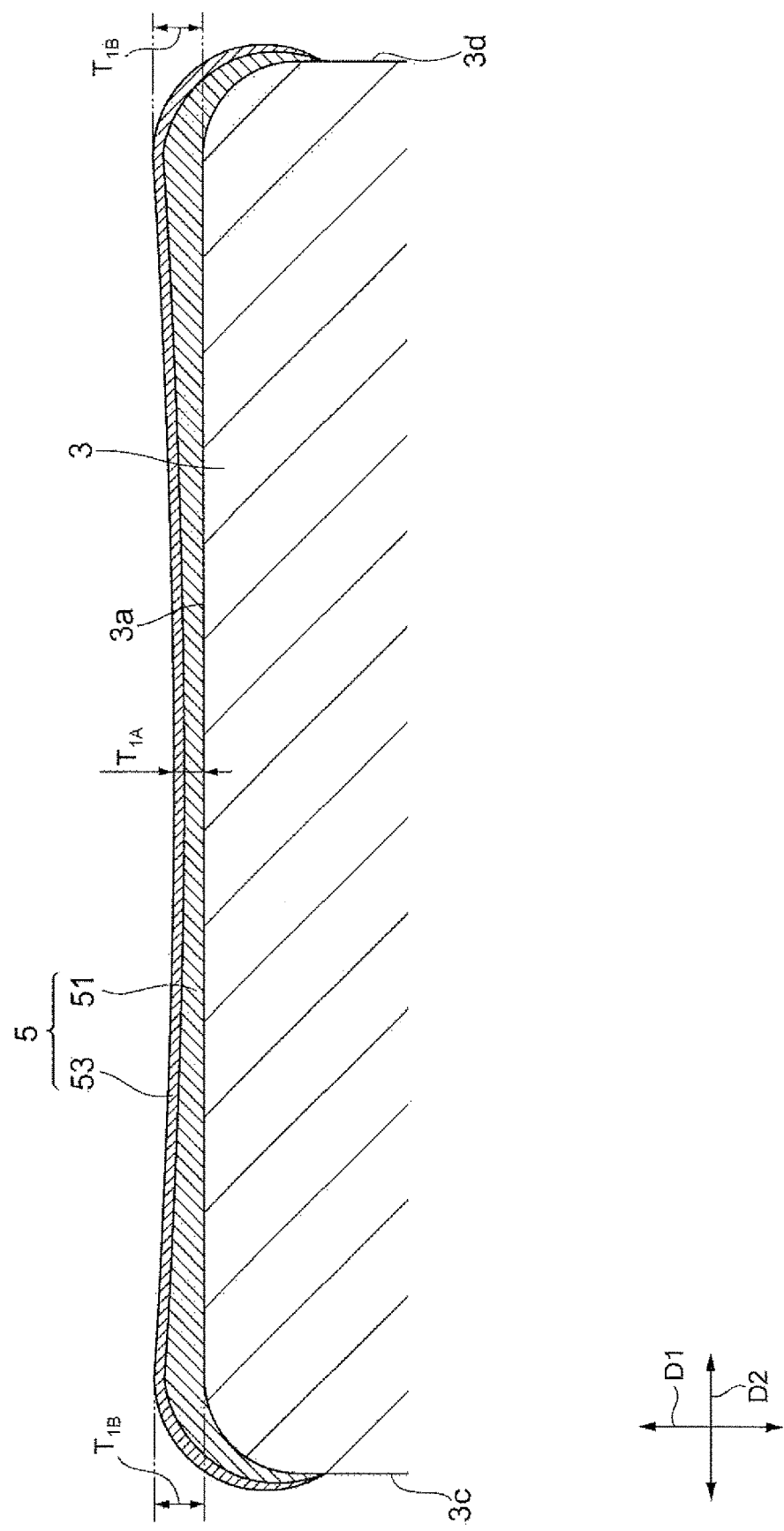
FIG. 6 is a diagram for describing a cross-sectional configuration of a first terminal electrode.

In a first electrode structure including the first sintered metal layer 51 and the first plating layer 53, as illustrated in FIG. 6, a depression is formed in an inner area when viewed from a direction perpendicular to the first principal surface 3a. Regarding a thickness of the first electrode structure, a thickness $T_{1A}$ of an inner portion when viewed from the direction perpendicular to the first principal surface 3a is less than a thickness $T_{1B}$ of an outer portion when viewed from the direction perpendicular to the first principal surface 3a. In FIG. 6, illustration of the plurality of internal electrodes 7, 8, 9, 10 is omitted.

The minimum thickness of the first sintered metal layer 51 in the above inner portion of the first electrode structure is, for example, 1-20 μm, and is preferably 5-15 μm. The maximum thickness of the first sintered metal layer 51 in the above outer portion of the first electrode structure is, for example, 10-30 and is preferably 16-25 μm. The thickness of the first plating layer 53 in the above inner portion of the first electrode structure is, for example, 2-5 μm. The thickness of the first plating layer 53 in the above outer portion of the first electrode structure is, for example, 2-5 μm.

The second terminal electrode 6 includes a second sintered metal layer 61, a second plating layer 63, and a solder layer 65. The solder layer 65 is the outermost layer of the second terminal electrode 6.

The second sintered metal layer 61 is formed on the second principal surface 3b, the edge portion of the first side surface 3c, the edge portion of the second side surface 3d, the edge portion of the third side surface 3e, and the edge portion of the fourth side surface 3f. The second sintered metal layer 61, similarly to the first sintered metal layer 51, is formed by, for example, applying the conductive paste to the outer surface of the element body 3, and sintering the applied conductive paste. The second sintered metal layer 61 is also a layer formed by sintering the metal component (metal powder) included in the conductive paste. The conductive paste is applied by using a printing method, for example.

In the embodiment, the second sintered metal layer 61 is also the sintered metal layer including the base metal. Specifically, the second sintered metal layer 61 is a sintered metal layer including Cu. The second sintered metal layer 61 may be the sintered metal layer including Ni. Thus, the second sintered metal layer 61 includes the base metal (such as Cu or Ni). In the conductive paste, for example, metal powder including the base metal, a glass component, an organic binder, and an organic solvent are mixed.

The second plating layer 63 is formed on the second sintered metal layer 61, and includes the base metal. The second plating layer 63, similarly to the first plating layer 53, is formed by using a plating method. The second plating layer 63 is disposed on the second sintered metal layer 61. In the embodiment, the second plating layer 63 is a Ni plating layer formed by Ni plating on the second sintered metal layer 61. The second plating layer 63 may be a Cu plating layer.

Figure 7:
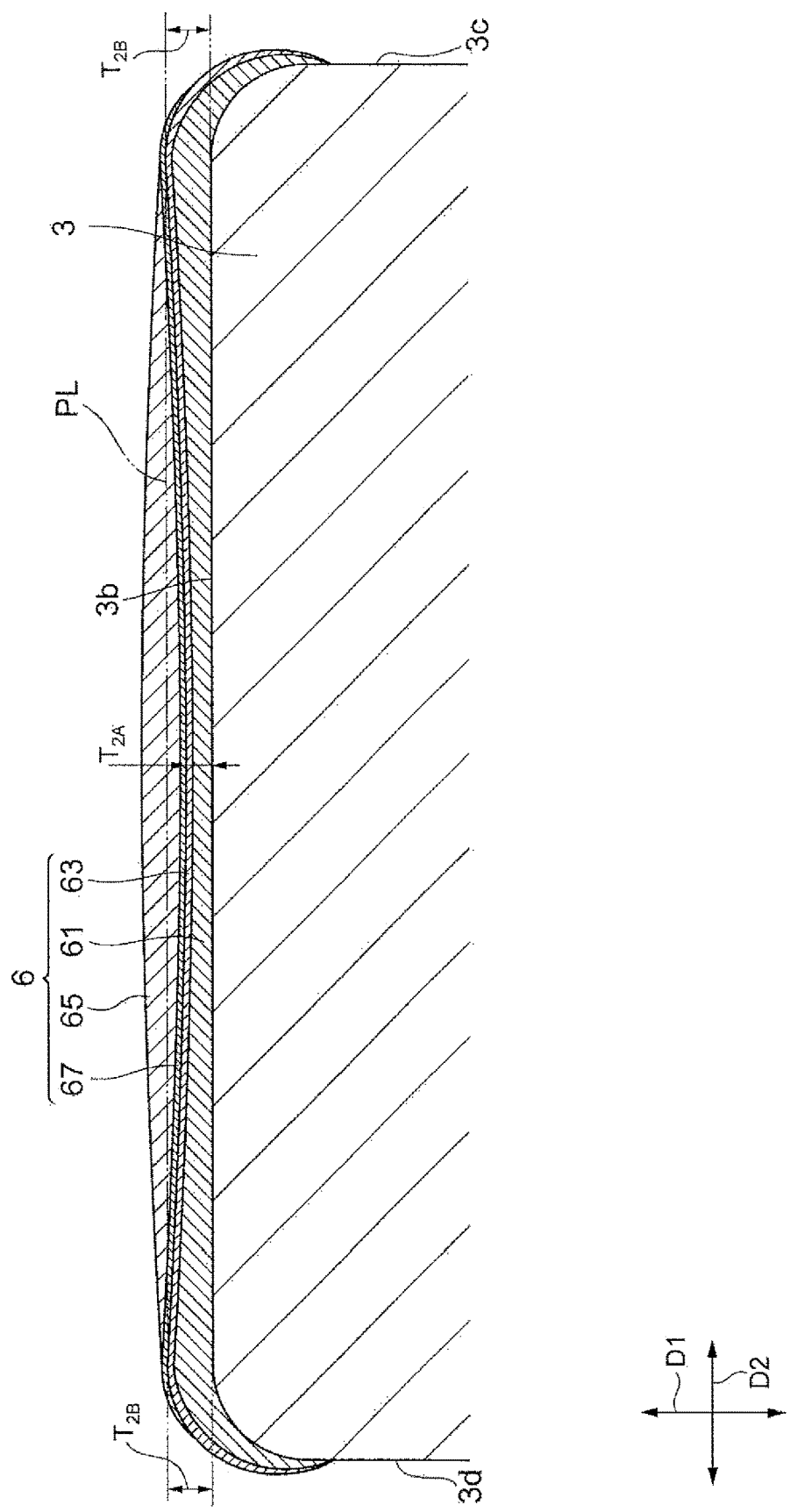
FIG. 7 is a diagram for describing a cross-sectional configuration of a second terminal electrode.

In a second electrode structure including the second sintered metal layer 61 and the second plating layer 63, as illustrated in FIG. 7, a depression is formed in an inner area when viewed from a direction perpendicular to the second principal surface 3b. Regarding a thickness of the second electrode structure, a thickness $T_{2A}$ of an inner portion when viewed from the direction perpendicular to the second principal surface 3b is less than a thickness $T_{2B}$ of an outer portion when viewed from the direction perpendicular to the second principal surface 3b. In FIG. 7, illustration of the plurality of internal electrodes 7, 8, 9, 10 is omitted.

The minimum thickness of the second sintered metal layer 61 in the above inner portion of the second electrode structure is, for example, 13 μm. The maximum thickness of the second sintered metal layer 61 in the above outer portion of the second electrode structure is, for example, 26 μm. The thickness of the second plating layer 63 in the above inner portion of the second electrode structure is for example, 1-4 μm. The thickness of the second plating layer 63 in the above outer portion of the second electrode structure is, for example, 1-4 μm.

The solder layer 65 is formed on the second plating layer 63, and includes Sn and a metal having a higher melting point than the melting point of Sn. In the embodiment, the solder layer 65 includes Sb as the metal having the higher melting point than the melting point of Sn. The solder layer 65 includes a Sn—Sb-based solder alloy. The solder layer 65 may include a precious metal (for example, Ag) as the metal having the higher melting point than the melting point of Sn.

The solder layer 65 is formed by using a reflow method. In the reflow method, solder paste is applied on the second plating layer 63, and the applied solder paste is heated. Thus, the solder paste is melted. After that, the melted solder paste is cooled, and the solder paste is solidified. Thus, the solder layer 65 is formed. The solder paste is applied on an intended position by using a printing method, for example. The solder paste includes Sn, a metal having the higher melting point than the melting point of Sn, and flux.

The solder layer 65 is formed convexly on the depression of the second electrode structure. The average thickness of the solder layer 65 is, for example, 20-30 µm. The maximum thickness of the solder layer 65 is, for example, 30-80 µm. The maximum thickness from a virtual plane PL being in contact with a position to be the maximum thickness in the above outer portion of the second electrode structure to a surface of the solder layer 65 is, for example, 10-50 µm.

In the embodiment, there is an area 67 in which an alloy of Ni and Sn is included, on the second electrode structure. The area 67 exists between the second plating layer 63 and the solder layer 65. The area 67 is formed by alloying Ni included in the second plating layer 63 and Sn included in the solder paste together when the solder paste applied on the second plating layer 63 is heated. The thickness of the area 67 is, for example, 0.5-2 µm.

Figure 8:
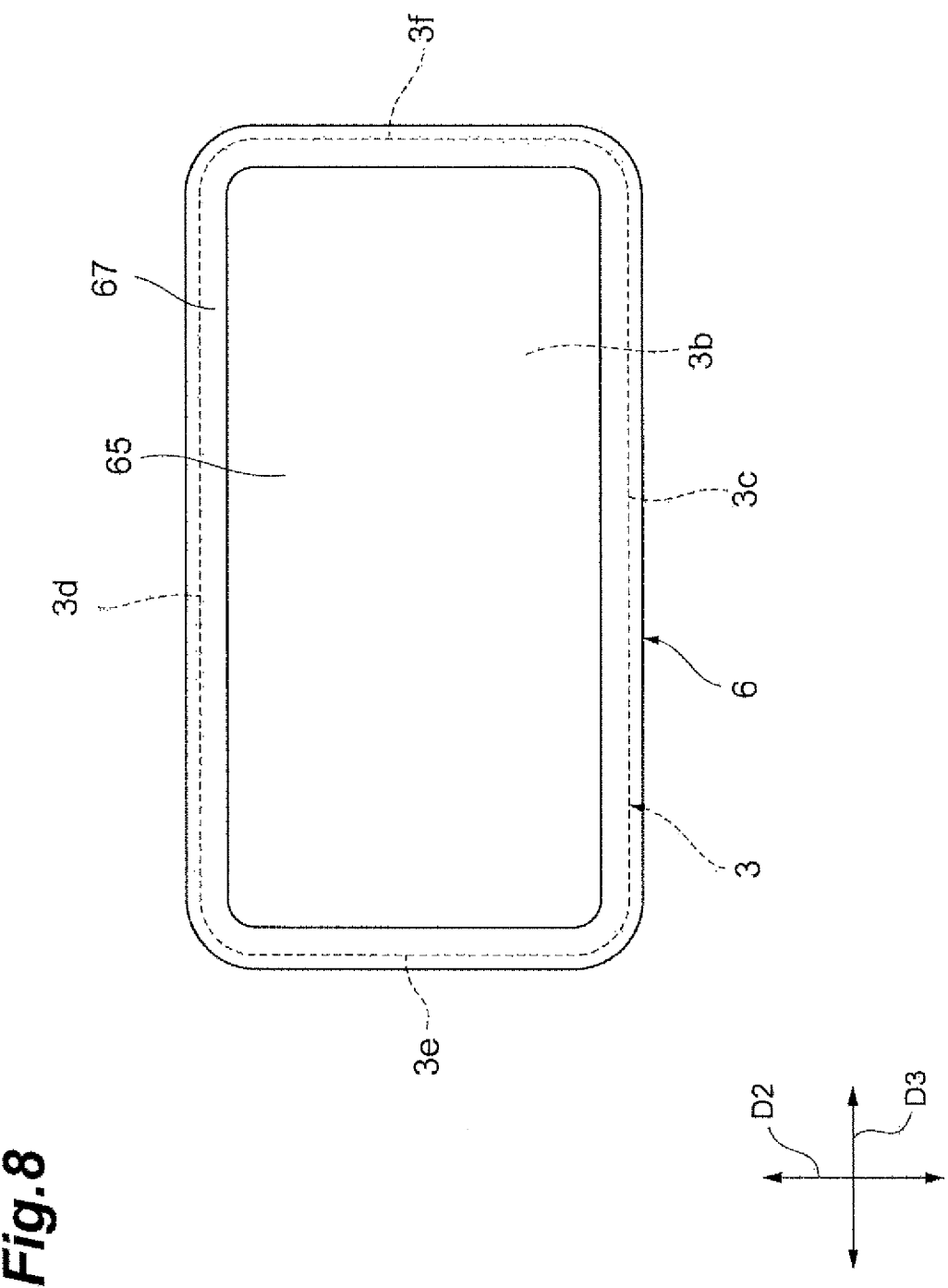
FIG. 8 is a diagram for describing a configuration of the second terminal electrode.

A peripheral portion of the area 67 is exposed from the solder layer 65, as illustrated in FIG. 8. When viewed from the direction perpendicular to the second principal surface 3b, the peripheral portion of the area 67 is positioned to surround the solder layer 65. The solder layer 65 is disposed on the second plating layer 63 via the area 67.

One end of each of the internal electrodes 7 is exposed to the first principal surface 3a of the element body 3. Each of the internal electrodes 7 is connected to the first terminal electrode 5. The other end of each of the internal electrodes 7 is positioned in the element body 3, and is not exposed to the second principal surface 3b. Each of the internal electrodes 7 is not connected to the second terminal electrode 6.

One end of each of the internal electrodes 9 is exposed to the second principal surface 3b of the element body 3. Each of the internal electrodes 9 is connected to the second terminal electrode 6. The other end of each of the internal electrodes 9 is positioned in the element body 3, and is not exposed to the first principal surface 3a. Each of the internal electrodes 9 is not connected to the first terminal electrode 5.

One end of each of the internal electrodes 8 is exposed to the first principal surface 3a of the element body 3. Each of the internal electrodes 8 is connected to the first terminal electrode 5. The other end of each of the internal electrodes 8 is positioned in the element body 3, and is not exposed to the second principal surface 3b. Each of the internal electrodes 8 is not connected to the second terminal electrode 6.

One end of each of the internal electrodes 10 is exposed to the second principal surface 3b of the element body 3. Each of the internal electrodes 10 is connected to the second terminal electrode 6. The other end of each of the internal electrodes 10 is positioned in the element body 3, and is not exposed to the first principal surface 3a. Each of the internal electrodes 10 is not connected to the first terminal electrode 5.

Since each of the internal electrodes 7 and each of the internal electrodes 8 are connected to the first terminal electrode 5, the polarity of each of the internal electrodes 7 and the polarity of each of the internal electrodes 8 are the same. Since each of the internal electrodes 9 and each of the internal electrodes 10 are connected to the second terminal electrode 6, the polarity of each of the internal electrodes 9 and the polarity of each of the internal electrodes 10 are the same. Since the internal electrodes 7, 8 and the internal electrodes 9, 10 are connected to different terminal electrodes from each other, the polarity of the internal electrodes 7, 8 and the polarity of the internal electrodes 9, 10 are different from each other.

Each of the internal electrodes 8 is disposed to be sandwiched between two internal electrodes 7. One internal electrode 8 and two internal electrodes 7 sandwiching the one internal electrode 8 are connected to the first terminal electrode 5, and are arranged contiguously in the second direction D2. These three internal electrodes 7, 8 are arranged in the second direction D2, in the order of the internal electrode 7, the internal electrode 8, and the internal electrode 7.

Each of the internal electrodes 10 is disposed to be sandwiched between two internal electrodes 9. One internal electrode 10 and two internal electrodes 9 sandwiching the one internal electrode 10 are connected to the second terminal electrode 6, and are arranged contiguously in the second direction D2. These three internal electrodes 9, 10 are arranged in the second direction D2, in the order of the internal electrode 9, the internal electrode 10, and the internal electrode 9.

The plurality of internal electrodes 7, 8, 9, 10 is divided into a plurality of first internal electrode groups and a plurality of second internal electrode groups. Each of the first internal electrode groups includes three internal electrodes 7, 8 arranged contiguously in the second direction D2. Each of the second internal electrode groups includes three internal electrodes 9, 10 arranged contiguously in the second direction D2. The first internal electrode groups and the second internal electrode groups are positioned alternately in the second direction D2.

Each of the internal electrodes 7 and each of the internal electrodes 8 adjacent to each other in the second direction D2 oppose each other. Each of the internal electrodes 7 and each of the internal electrodes 9 adjacent to each other in the second direction D2 oppose each other. Each of the internal electrodes 9 and each of the internal electrodes 10 adjacent to each other in the second direction D2 oppose each other. An interval between each of the internal electrodes 7 and each of the internal electrodes 8 adjacent to each other in the second direction D2, an interval between each of the internal electrodes 7 and each of the internal electrodes 9 adjacent to each other in the second direction D2, and an interval between each of the internal electrodes 9 and each of the internal electrodes 10 adjacent to each other in the second direction D2 are equivalent to each other. The plurality of internal electrodes 7, 8, 9, 10 is arranged at equal intervals in the second direction D2. The "equivalent" does not necessarily mean only that values are exactly equal to each other. Even in a case in which a slight difference within a predetermined range or a manufacturing error is included in the values, the values may be regarded as being equivalent to each other. For example, in a case in which the intervals between the internal electrodes 7, 9 adjacent to each other are included within a range of ±10% from the average value of the intervals, the intervals may be defined as being equivalent to each other.

Figure 4:
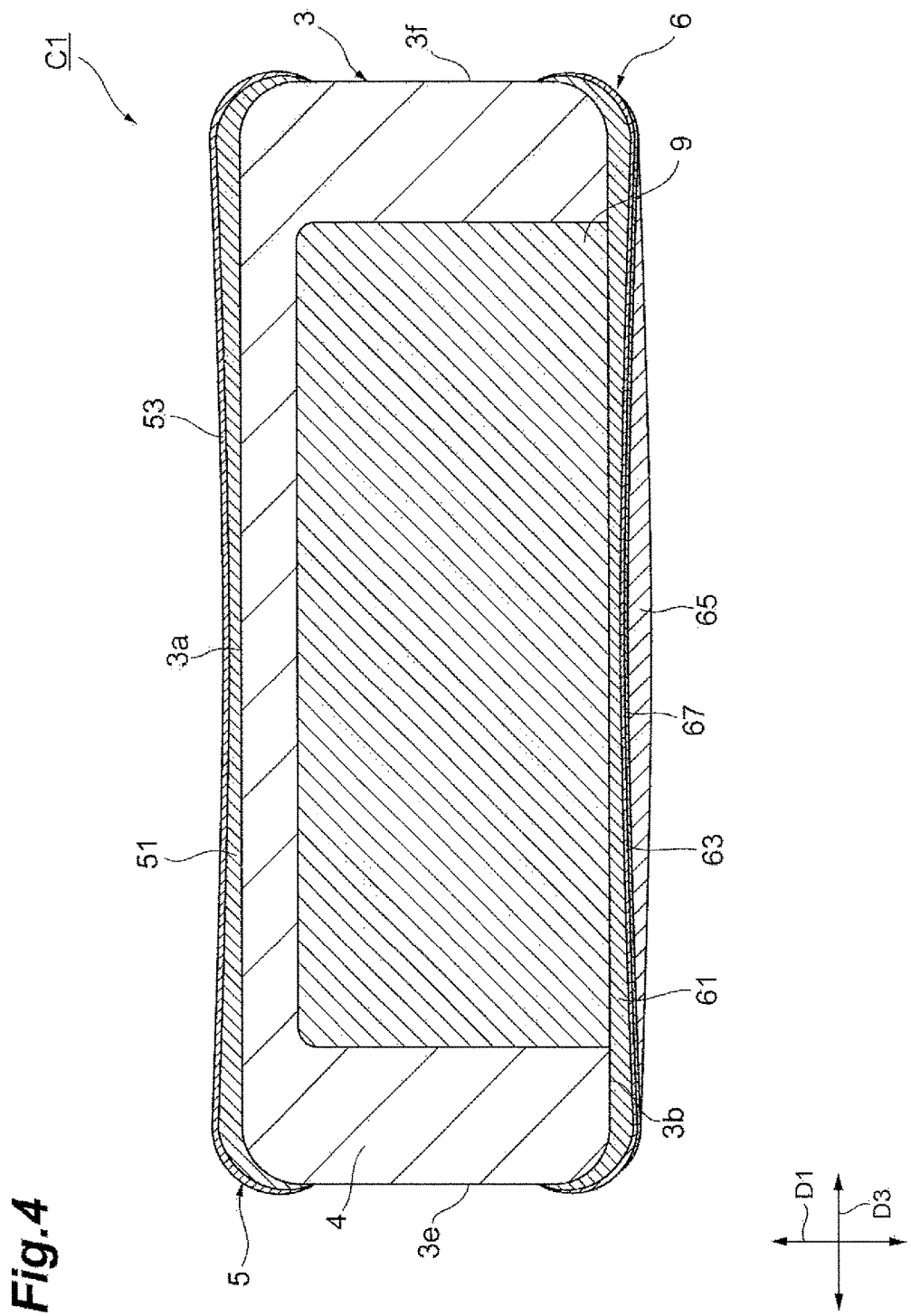
FIG. 4 is a diagram for describing a cross-sectional configuration of the multilayer ceramic capacitor according to the embodiment.
Figure 5:
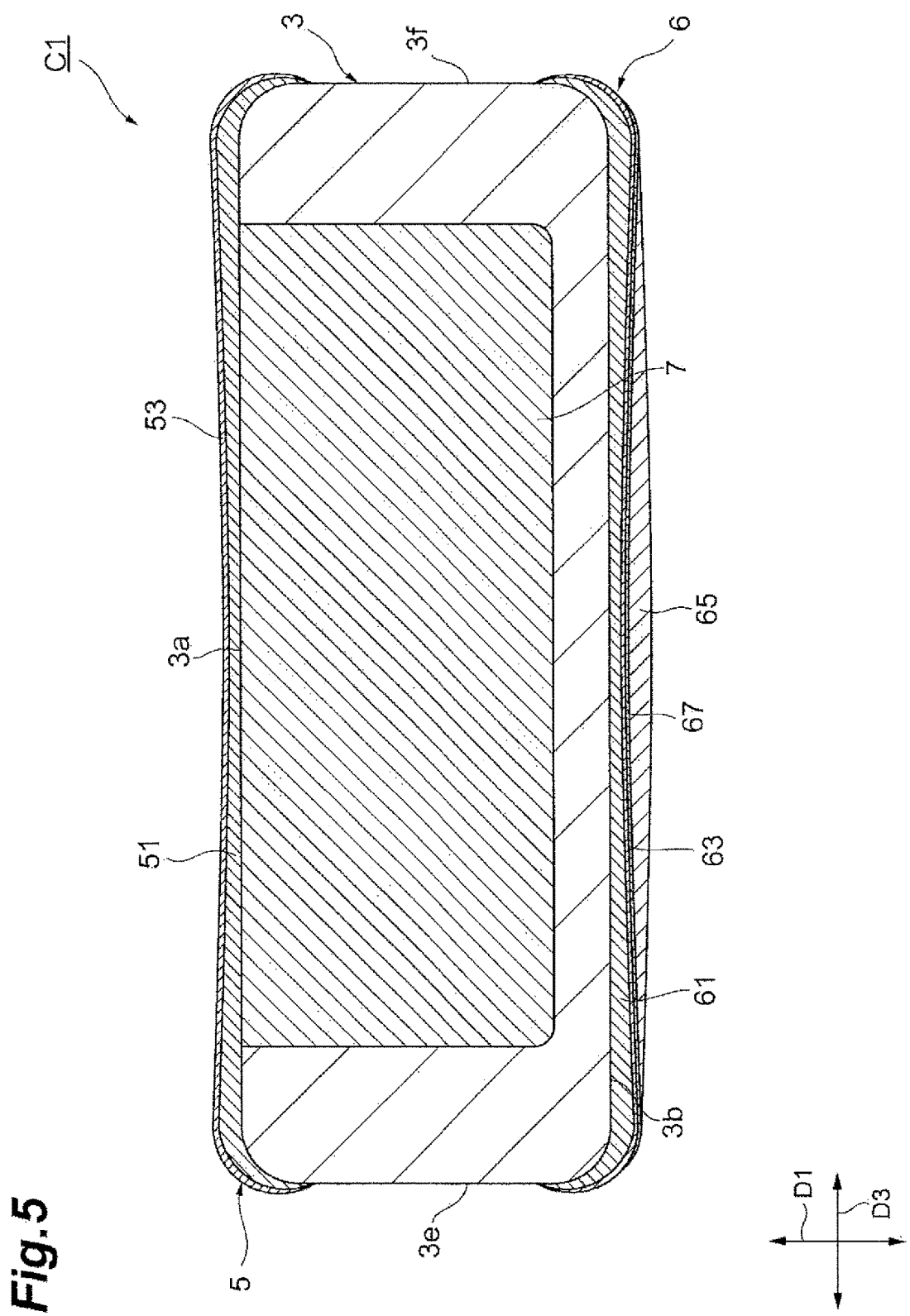
FIG. 5 is a diagram for describing a cross-sectional configuration of the multilayer ceramic capacitor according to the embodiment.

Each of the internal electrodes 7, 8, 9, 10 has, for example, a rectangular shape in a plan view, as illustrated in FIG. 4 and FIG. 5. In each of the internal electrodes 7, 8, 9, 10, the length in the third direction D3 is greater than the length in the first direction D1. Each of the internal electrodes 7, 8, 9, 10 includes a metal material (for example, Ni or Cu) normally used as an internal electrode of an electric element of a multilayer type. Each of the internal electrodes 7, 8, 9, 10 is configured as a sintered body of a conductive paste including the above metal material.

Figure 3:
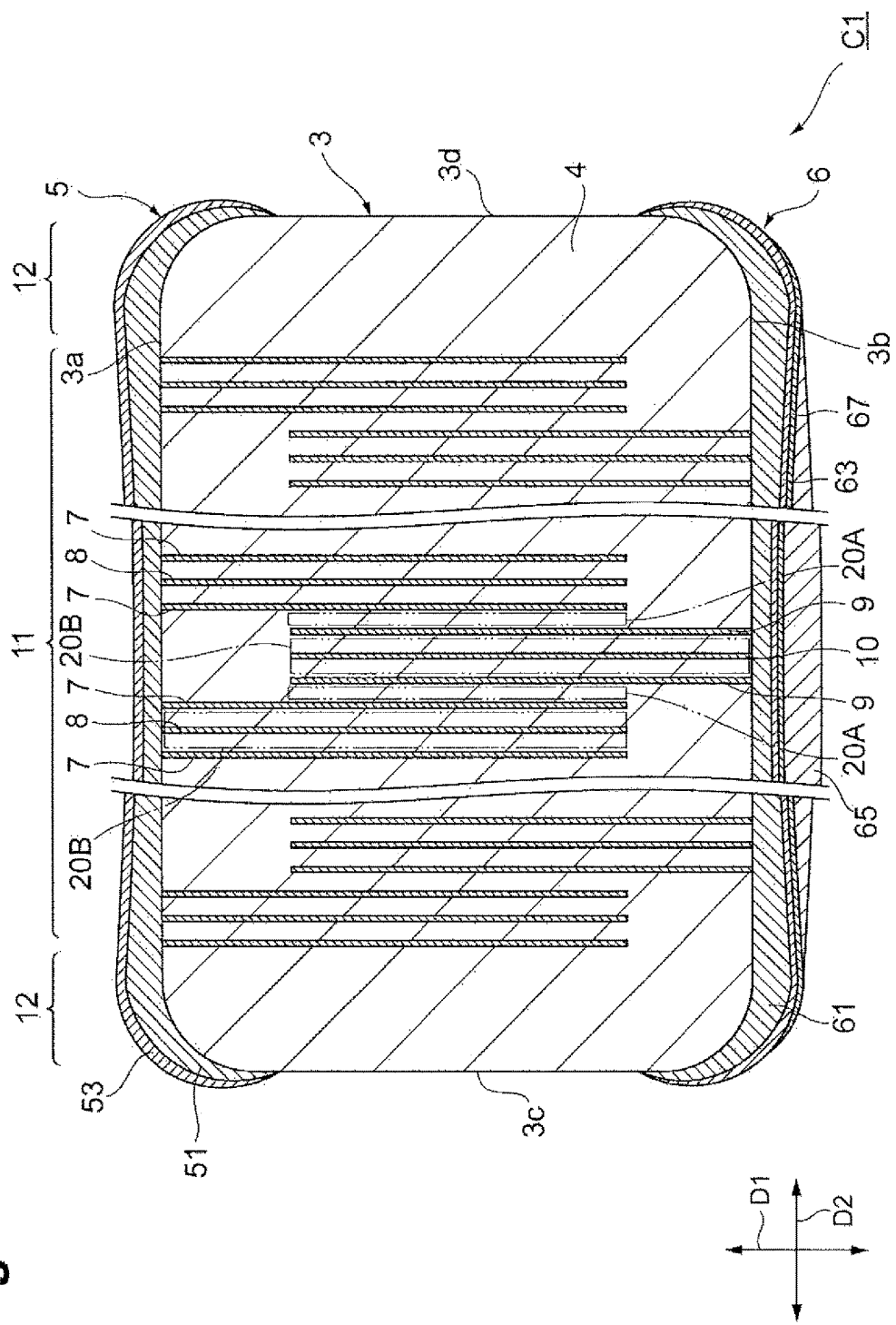
FIG. 3 is a diagram for describing a cross-sectional configuration of the multilayer ceramic capacitor according to the embodiment.

The element body 3 includes a plurality of first areas 20A and a plurality of second areas 20B, as illustrated in FIG. 3. Each of the first areas 20A is positioned between each of the internal electrodes 7 and each of the internal electrodes 9 opposing each other. Since each of the internal electrodes 7 and each of the internal electrodes 9 opposing each other have different polarities from each other, each of the first areas 20A generates capacitance. Each of the second areas 20B is positioned between a pair of internal electrodes 7 opposing each other via each of the internal electrodes 8, and between a pair of internal electrodes 9 opposing each other via each of the internal electrodes 10. Since each of the internal electrodes 8 and each of the internal electrodes 7 have the same polarity, and each of the internal electrodes 9 and each of the internal electrodes 10 have the same polarity, each of the second areas 20B does not generate capacitance.

Each of the internal electrodes 8, 10 is disposed to divide each of the second areas 20B. Each of the internal electrodes 8 does not contribute to generation of capacitance. Each of the internal electrodes 8 divides each of the second areas 20B positioned between the pair of internal electrodes 7 into two areas. Widths in the second direction D2 of the two areas divided by each of the internal electrodes 8 are equivalent to each other. Each of the internal electrodes 10 does not contribute to generation of capacitance. Each of the internal electrodes 10 divides each of the second areas 20B positioned between the pair of internal electrodes 9 into two areas. Widths in the second direction D2 of the two areas divided by each of the internal electrodes 10 are equivalent to each other. A width in the second direction D2 of each of the areas divided by each of the internal electrodes 8 and a width in the second direction D2 of each of the areas divided by each of the internal electrodes 10 are equivalent to each other.

The first areas 20A and the second areas 20B are positioned alternately in the second direction D2. Each of the first areas 20A is positioned between a pair of second areas 20B. The pair of second areas 20B sandwiches each of the first areas 20A in the second direction D2.

Figure 9:
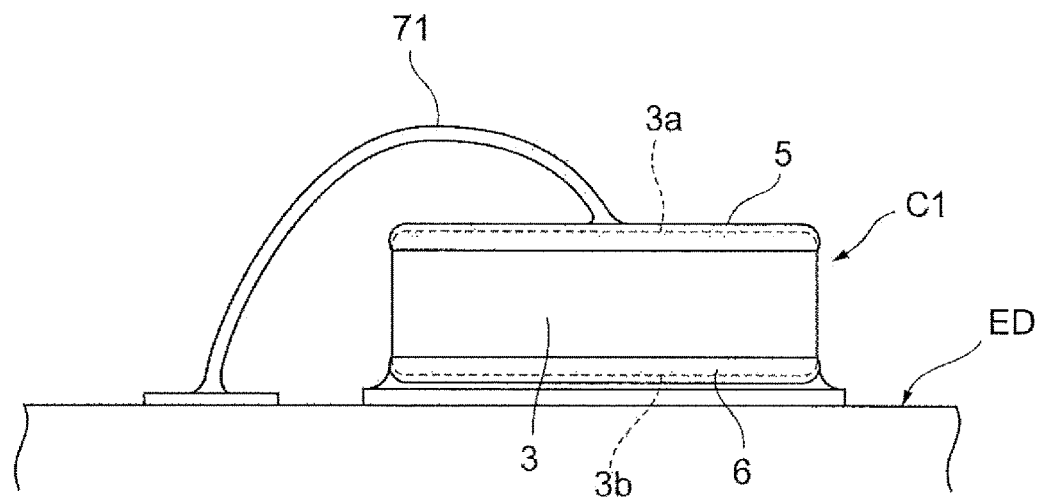
FIG. 9 is a diagram for describing mounting structure of the multilayer ceramic capacitor according to the embodiment.

As described above, in the embodiment, the first terminal electrode 5 includes the first plating layer 53. For this reason, in the multilayer ceramic capacitor C1, as illustrated in FIG. 9, wire bonding mounting is possible using wire 71 including the base metal on the first principal surface 3a side. The wire bonding mounting using the wire 71 including the base metal is less expensive than the wire bonding mounting using wire including Au. The wire 71 is, for example, wire including Al or Cu.

The second terminal electrode 6 includes the solder layer 65. For this reason, in the multilayer ceramic capacitor C1, as illustrated in FIG. 9, solder mounting is possible on the second principal surface 3b side.

FIG. 9 is a diagram for describing mounting structure of the multilayer ceramic capacitor according to the embodiment. The multilayer ceramic capacitor C1 is electrically and physically connected to an electronic device ED (for example, circuit board or electronic component) by using the solder mounting. The multilayer ceramic capacitor C1 is electrically connected to the electronic device ED by using the wire bonding mounting.

The second sintered metal layer 61 includes a glass component in order to increase bonding strength between the second sintered metal layer 61 and the element body 3. In general, the glass component has poor solder wettability. For this reason, in a case in which the solder layer 65 is formed on the second sintered metal layer 61, the bonding strength between the second sintered metal layer 61 and the solder layer 65 may be decreased due to the glass component included in the second sintered metal layer 61. In contrast to it, in the multilayer ceramic capacitor C1, since the second terminal electrode 6 includes the second plating layer 63, that is, the second plating layer 63 is formed on the second sintered metal layer 61, the bonding strength between the second electrode structure and the solder layer 65 is improved. In a case in which the second plating layer 63 is a Ni plating layer, heat resistance of the second plating layer 63 is improved, and solder corrosion resistance of the second plating layer 63 is improved.

In the embodiment, the first plating layer 53 is formed on the first sintered metal layer 51 formed on the first principal surface 3a, and the second plating layer 63 is formed on the second sintered metal layer 61 formed on the second principal surface 3b. For this reason, infiltration of a plating solution into the element body 3 is suppressed by the first sintered metal layer 51, in the embodiment, in comparison with a multilayer ceramic capacitor including a configuration in which the first terminal electrode 5 does not include the first sintered metal layer 51, when the first plating layer 53 is formed. Similarly, infiltration of a plating solution into the element body 3 is suppressed by the second sintered metal layer 61, in the embodiment, in comparison with a multilayer ceramic capacitor including a configuration in which the second terminal electrode 6 does not include the second sintered metal layer 61, when the second plating layer 63 is formed. The infiltration of the plating solution may deteriorate electrical characteristics of the multilayer ceramic capacitor C1. Therefore, the infiltration of the plating solution is suppressed, so that deterioration of the electrical characteristics of the multilayer ceramic capacitor C1 is suppressed.

The first plating layer 53 is a Ni plating layer or a Cu plating layer. For this reason, the wire including Al or Cu is easily bonded to the first plating layer 53.

In the second electrode structure including the second sintered metal layer 61 and the second plating layer 63, the depression is formed in the inner area when viewed from the direction perpendicular to the second principal surface 3b. The solder layer 65 is formed convexly on the depression. In the multilayer ceramic capacitor C1, an amount of solder configuring the solder layer 65 is greater in comparison with, for example, a multilayer ceramic capacitor including a configuration in which the depression is not formed in the second electrode structure. For this reason, when the multilayer ceramic capacitor C1 is solder-mounted to the electronic device ED on the second principal surface 3b side, generation of a void in the solder is suppressed. As a result, the bonding strength between the multilayer ceramic capacitor C1 and the electronic device ED is improved.

The metal included in the solder layer 65 and having the higher melting point than the melting point of Sn is Sb. The solder layer 65 including Sb as the metal having the higher melting point than the melting point of Sn is less expensive than the solder layer including the precious metal as the metal having the higher melting point than the melting point of Sn. For this reason, cost down of the multilayer ceramic capacitor C1 is possible.

The second plating layer 63 is a Ni plating layer, and there is the area 67 in which the alloy of Ni and Sn exists, between the second plating layer 63 and the solder layer 65. As a result, the bonding strength between the second plating layer 63 and the solder layer 65 is improved.

In the embodiment, the peripheral portion of the area 67 is exposed from the solder layer 65. The peripheral portion of the area 67 is positioned to surround the solder layer 65, when viewed from the direction perpendicular to the second principal surface 3b. The area 67 in which the alloy of Ni and Sn exists has low solder wettability. For this reason, spillage is suppressed of the solder configuring the solder layer 65 from the depression formed on the second electrode structure.

The first sintered metal layer 51 and the second sintered metal layer 61 include the base metal. The first sintered metal layer 51 and the second sintered metal layer 61 are less expensive than the sintered metal layer including a metal other than the base metal (for example, precious metal). For this reason, cost down of the multilayer ceramic capacitor C1 is possible. Since the first sintered metal layer 51 and the first plating layer 53 include the base metal, adhesion between the first sintered metal layer 51 and the first plating layer 53 is improved. Since the second sintered metal layer 61 and the second plating layer 63 include the base metal, adhesion between the second sintered metal layer 61 and the second plating layer 63 is improved.

A hole may be formed in the first sintered metal layer 51 and the second sintered metal layer 61. In a case in which the hole is formed in the first sintered metal layer 51 and the second sintered metal layer 61, moisture infiltrates from the hole, and may influence the electrical characteristics of the multilayer ceramic capacitor C1. In the embodiment, since the first terminal electrode 5 includes the first plating layer 53, the hole is closed by the first plating layer 53 even in a case in which the hole is formed in the first sintered metal layer 51. Therefore, infiltration is suppressed of the moisture and the like from the hole formed in the first sintered metal layer 51. Since the second terminal electrode 6 includes the second plating layer 63, the hole is closed by the second plating layer 63 even in a case in which the hole is formed on the second sintered metal layer 62. Therefore, infiltration is reliably prevented of the moisture and the like from the hole formed in the second sintered metal layer 61. Thus, moisture resistance of the multilayer ceramic capacitor C1 is improved, and deterioration of the electrical characteristics of the multilayer ceramic capacitor C1 is reliably prevented.

The multilayer ceramic capacitor C1 includes the plurality of internal electrodes 7, 8, 9, 10 arranged at equal intervals in the second direction D2 to oppose each other, inside the element body 3. The plurality of internal electrodes 7 is connected to the first terminal electrode 5, and is not connected to the second terminal electrode 6. The plurality of internal electrodes 9 is connected to the second terminal electrode 6, and is not connected to the first terminal electrode 5. The plurality of internal electrodes 8 is not connected to at least the second terminal electrode 6. The plurality of internal electrodes 10 is not connected to at least the first terminal electrode 5. The element body 3 includes the plurality of first areas 20A and the plurality of second areas 20B. Each of the first areas 20A is positioned between each of the internal electrodes 7 and each of the internal electrodes 9 opposing each other. Each of the second areas 20B is positioned between the pair of internal electrodes 7 opposing each other via each of the internal electrodes 8, and between the pair of internal electrodes 9 opposing each other via each of the internal electrodes 10. The first areas 20A and the second areas 20B are positioned alternately in the second direction D2.

The internal electrodes 7 connected to the first terminal electrode 5 and the internal electrodes 9 connected to the second terminal electrode 6 have different polarities from each other. Each of the first areas 20A positioned between the internal electrodes 7, 9 opposing each other generates capacitance. The internal electrodes 7 have the same polarity to each other. The internal electrodes 8 not connected to the second terminal electrode 6 do not have a different polarity from a polarity of the internal electrodes 7 at least. The internal electrodes 9 have the same polarity to each other. The internal electrodes 10 not connected to the first terminal electrode 5 do not have a different polarity from a polarity of the internal electrodes 9 at least. Therefore, each of the second areas 20B positioned between the pair of internal electrodes 7 opposing each other via each of the internal electrodes 8, and each of the second areas 20B formed between the pair of internal electrodes 9 opposing each other via the internal electrodes 10 do not generate capacitance.

The element body 3 includes the inner layer portion 11 (internal electrode disposition area) in which the plurality of internal electrodes 7, 8, 9, 10 is disposed, and the pair of outer layer portions 12 (internal electrode non-disposition area) in which the plurality of internal electrodes 7, 8, 9, 10 is not disposed. The pair of outer layer portions 12 sandwiches the inner layer portion 11 in the second direction D2. The inner layer portion 11 includes the plurality of first areas 20A that generates capacitance, and the plurality of second areas 20B that does not generate capacitance. In the multilayer ceramic capacitor C1, a desired capacitance is secured by the plurality of first areas 20A.

The second areas 20B that does not generate capacitance is included in the inner layer portion 11. For this reason, in the multilayer ceramic capacitor C1, the inner layer portion 11 is wider and the outer layer portions 12 is narrower, in comparison with, for example, the following multilayer ceramic capacitor to be compared. In the multilayer ceramic capacitor to be compared, the internal electrodes having different polarities are disposed alternately. The size of the element body of the multilayer ceramic capacitor to be compared is the same as the size of the element body of the multilayer ceramic capacitor C1, and the capacitance of the multilayer ceramic capacitor to be compared is the same as the capacitance of the multilayer ceramic capacitor C1.

In the multilayer ceramic capacitor C1, the element body 3 is configured as a sintered body of a dielectric ceramic material, and each of the internal electrodes 7, 8, 9, 10 is configured as a sintered body of a metal material. A degree of sintering of the dielectric ceramic material in the inner layer portion 11 and a degree of sintering of the dielectric ceramic material in the outer layer portions 12 are different from each other due to presence/absence of the metal material to be the internal electrodes 7, 8, 9, 10. For example, the degree of sintering of the dielectric ceramic material in the outer layer portions 12 is lower than the degree of sintering of the dielectric ceramic material in the inner layer portion 11. In a case in which the degree of sintering of the dielectric ceramic material in the inner layer portion 11 and the degree of sintering of the dielectric ceramic material in the outer layer portions 12 are different from each other, a crack may be generated in the element body 3.

In the inner layer portion 11, all internal electrodes 7, 8, 9, 10 are arranged at equal intervals in the second direction D2. For this reason, in the inner layer portion 11, the degree of sintering of the dielectric ceramic is substantially uniform. In the multilayer ceramic capacitor C1, the inner layer portion 11 is wider than that of the above multilayer ceramic capacitor to be compared, that is, the area is wider in which the degree of sintering of the dielectric ceramic is substantially uniform. For this reason, the degree of sintering of the dielectric ceramic in the entire of the element body 3 is stabilized. As a result, in the multilayer ceramic capacitor C1, generation of the crack in the element body 3 is suppressed.

In a case in which voltage is applied to the multilayer ceramic capacitor C1, mechanical strain of a size depending on the applied voltage is generated due to electrostrictive effect in the element body. Since stress is generated in the element body 3 by the mechanical strain due to the electrostrictive effect, a crack may be generated in the element body 3.

In the multilayer ceramic capacitor C1, the mechanical strain due to the electrostrictive effect is generated in the first areas 20A; however, the mechanical strain due to the electrostrictive effect is not generated in the second areas 20B. The first areas 20A and the second areas 20B are positioned alternately in the second direction D2. For this reason, in the multilayer ceramic capacitor C1, in comparison with the multilayer ceramic capacitor including a configuration in which the inner layer portion 11 does not include the second areas 20B, the areas in which the mechanical strain due to the electrostrictive effect is generated are distributed in the inner layer portion 11. Thus, since concentration of the stress is suppressed that is generated by the mechanical strain due to the electrostrictive effect, generation of the crack in the element body 3 is suppressed.

From these things, in the multilayer ceramic capacitor C1, generation of the crack is suppressed while the desired capacitance is secured.

In the embodiment, each of the internal electrodes 8 does not have to be connected to the first terminal electrode 5. Each of the internal electrodes 10 does not have to be connected to the second terminal electrode 6. Each of the internal electrodes 8, 10 does not have to be connected to the first terminal electrode 5 and the second terminal electrode 6.

In the embodiment, the number of the internal electrodes 7, 8 included in, each of the first internal electrode groups may be "four" or greater. The number of the internal electrodes 9, 10 included in each of the second internal electrode groups may be "four" or greater.

Figure 10:
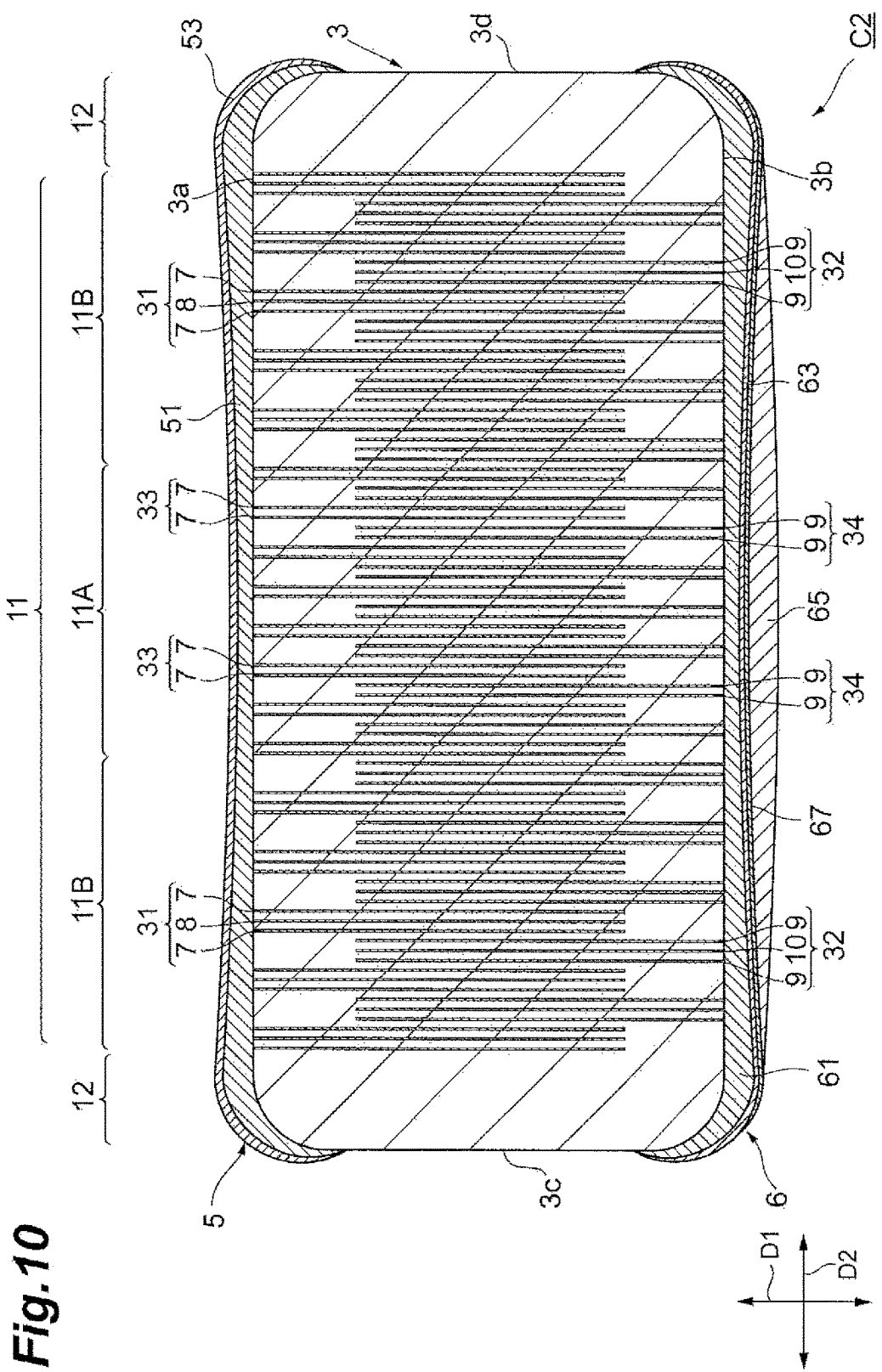
FIG. 10 is a diagram for describing a cross-sectional configuration of a multilayer ceramic capacitor according to a modification example of the embodiment.
Figure 11:
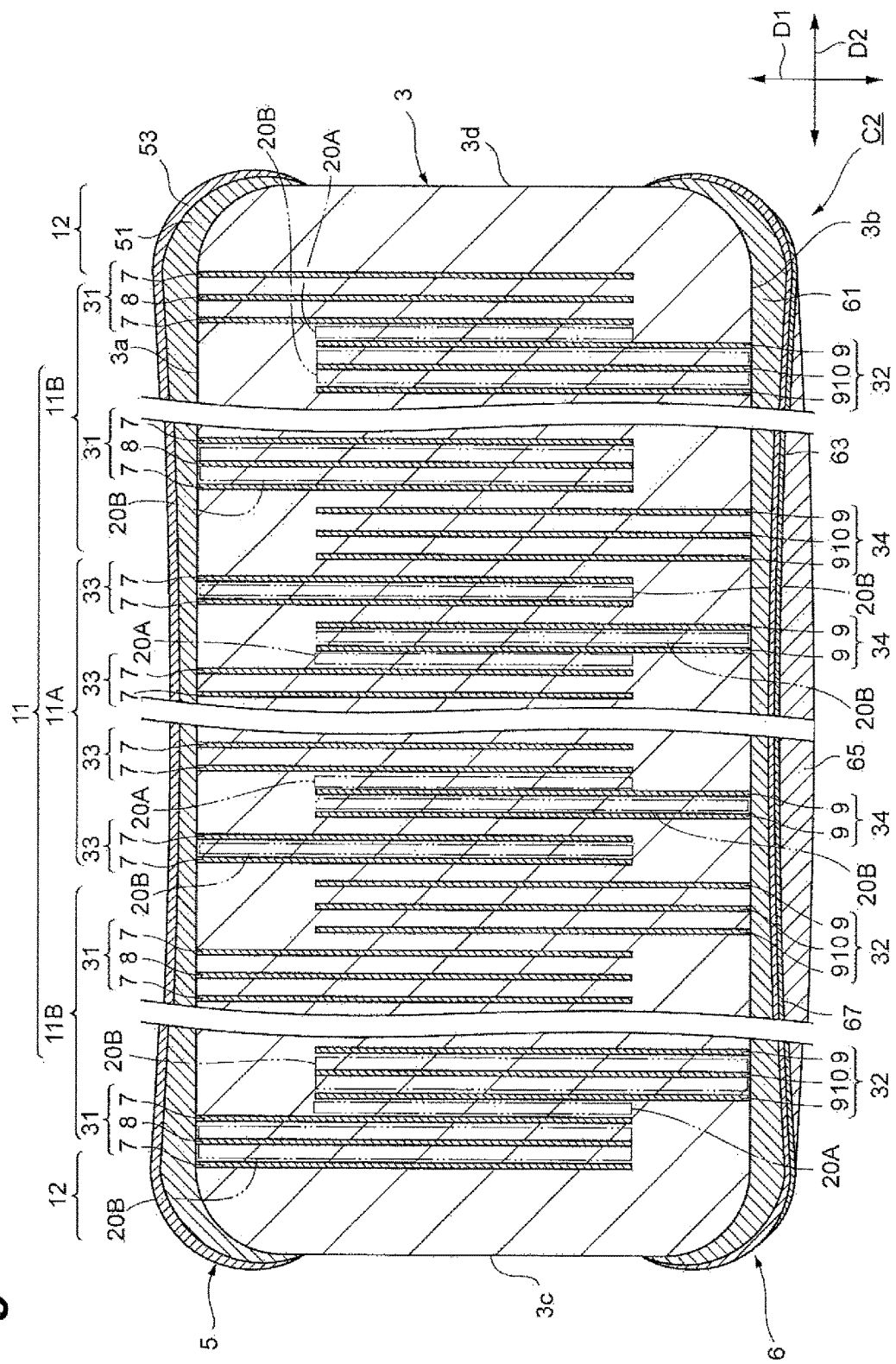
FIG. 11 is a diagram for describing a cross-sectional configuration of the multilayer ceramic capacitor according to the modification example of the embodiment.

Next, a configuration is described of a multilayer ceramic capacitor C2 according to a modification example of the embodiment, with reference to FIG. 10 and FIG. 11. FIG. 10 and FIG. 11 are diagrams for describing a cross-sectional configuration of the multilayer ceramic capacitor according to the present modification example.

The multilayer ceramic capacitor C2 includes an element body 3, a first terminal electrode 5 and a second terminal electrode 6, and a plurality of internal electrodes 7, 9.

An inner layer portion 11 of the element body 3 includes an inner portion 11A, and a pair of outer portions 11B. The pair of outer portions 11B is positioned to sandwich the inner portion 11A in the second direction D2.

A plurality of internal electrodes 7, 8, 9, 10 is divided into a plurality of internal electrode groups 31, 32 and a plurality of internal electrode groups 33, 34. The plurality of internal electrode groups 31, 32 is positioned in the outer portions 11B of the element body 3. The plurality of internal electrode groups 33, 34 is positioned in the inner portion 11A of the element body 3.

Each of the first internal electrode groups includes three internal electrodes 7, 8 arranged contiguously in the second direction D2. Each of the second internal electrode groups includes three internal electrodes 9, 10 arranged contiguously in the second direction D2. The first internal electrode groups and the second internal electrode groups are positioned alternately in the second direction D2.

Each of the internal electrodes 7 and each of the internal electrodes 8 adjacent to each other in the second direction D2 oppose each other. Each of the internal electrodes 7 and each of the internal electrodes 9 adjacent to each other in the second direction D2 oppose each other. Each of the internal electrodes 9 and each of the internal electrodes 10 adjacent to each other in the second direction D2 oppose each other. An interval between each of the internal electrodes 7 and each of the internal electrodes 8 adjacent to each other in the second direction D2, an interval between each of the internal electrodes 7 and each of the internal electrodes 9 adjacent to each other in the second direction D2, and an interval between each of the internal electrodes 9 and each of the internal electrodes 10 adjacent to each other in the second direction D2 are equivalent to each other. The plurality of internal electrodes 7, 8, 9, 10 is arranged at equal intervals in the second direction D2.

Each of the internal electrode groups 31 includes three internal electrodes 7, 8 arranged contiguously in the second direction D2. Each of the internal electrodes 7 and each of the internal electrodes 8 adjacent to each other in the second direction D2 oppose each other, in each of the internal electrode groups 31.

Each of the internal electrode groups 32 includes three internal electrodes 9, 10 arranged contiguously in the second direction D2. Each of the internal electrodes 9 and each of the internal electrodes 10 adjacent to each other in the second direction D2 oppose each other, in each of the internal electrode groups 32.

Each of the internal electrode groups 33 includes a pair of internal electrodes 7 arranged contiguously in the second direction D2. The pair of internal electrodes 7 adjacent to each other in the second direction D2 oppose each other, in each of the internal electrode groups 33.

Each of the internal electrode groups 34 includes a pair of internal electrodes 9 arranged contiguously in the second direction D2. The pair of internal electrodes 9 adjacent to each other in the second direction D2 oppose each other, in each of the internal electrode groups 34.

One end of each of the internal electrodes 7, 8 included in each of the internal electrode groups 31, 33 is exposed to a first principal surface 3a of the element body 3. Each of the internal electrodes 7, 8 is connected to the first terminal electrode 5. The other end of each of the internal electrodes 7, 8 is positioned in the element body 3, and is not exposed to a second principal surface 3b. The internal electrodes 7, 8 are not connected to the second terminal electrode 6.

One end of each of the internal electrodes 9, 10 included in each of the internal electrode groups 32, 34 is exposed to the second principal surface 3b of the element body 3. Each of the internal electrodes 9, 10 is connected to the second terminal electrode 6. The other end of each of the internal electrode 9, 10 is positioned in the element body 3, and is not exposed to the second principal surface 3b. The internal electrodes 9, 10 are not connected to the first terminal electrode 5.

The internal electrode groups 31 and the internal electrode groups 32 are arranged alternately in the second direction D2. One internal electrode 7 of the pair of internal electrodes 7 included in each of the internal electrode groups 31 and one internal electrode 9 of the pair of internal electrodes 9 included in each of the internal electrode groups 32 oppose each other in the second direction D2. Since the internal electrodes 7 and the internal electrodes 9 are connected to different terminal electrodes from each other, the polarity of the internal electrodes 7 and the polarity of the internal electrodes 9 are different from each other. Therefore, each of first areas 20A that generates capacitance is positioned between each of the internal electrodes 7 and each of the internal electrodes 9 opposing each other.

Since the three internal electrodes 7, 8 included in each of the internal electrode groups 31 are connected to the first terminal electrode 5, the polarities of the three internal electrodes 7, 8 are the same. Therefore, each of second areas 20B that does not generate capacitance is positioned between the pair of internal electrodes 7, in each of the internal electrode groups 31. Each of the second areas 20B is positioned in the outer portions 11B.

Since the three internal electrodes 9, 10 included in each of the internal electrode groups 32 are connected to the second terminal electrode 6, the polarities of the three internal electrodes 9, 10 are the same. Therefore, each of second areas 20B that does not generate capacitance is positioned between the pair of internal electrodes 9, also in each of the internal electrode groups 32. Each of these second areas 20B is also positioned in the outer portions 11B.

The internal electrode groups 33 and the internal electrode groups 34 are arranged alternately in the second direction D2. One internal electrode 7 of the pair of internal electrodes 7 included in each of the internal electrode groups 33 and one internal electrode 9 of the pair of internal electrodes 9 included in each of the internal electrode groups 34 oppose each other in the second direction D2. Since the polarity of the internal electrodes 7 and the polarity of the internal electrodes 9 are different from each other, each of first areas 20A that generates capacitance is positioned between each of the internal electrodes 7 and each of the internal electrodes 9 opposing each other.

Since the pair of internal electrodes 7 included in each of the internal electrode groups 33 is connected to the first terminal electrode 5, the polarities of the pair of internal electrodes 7 are the same. Therefore, each of second areas 20B that does not generate capacitance is positioned between the pair of internal electrodes 7, also in each of the internal electrode groups 33. Each of these second areas 20B is positioned in the inner portion 11A.

Since the pair of internal electrodes 9 included in each of the internal electrode groups 34 is connected to the second terminal electrode 6, the polarities of the pair of internal electrodes 9 are the same. Therefore, each of second areas 20B that does not generate capacitance is positioned between the pair of internal electrodes 9, also in each of the internal electrode groups 34. Each of these second areas 20B is also positioned in the inner portion 11A.

An interval between the pair of internal electrodes 7 adjacent to each other in the second direction D2, an interval between the pair of internal electrodes 9 adjacent to each other in the second direction D2, an interval between each of the internal electrodes 7 and each of the internal electrodes 8 adjacent to each other in the second direction D2, an interval between each of the internal electrodes 7 and each of the internal electrodes 9 adjacent to each other in the second direction D2, and an interval between each of the internal electrodes 9 and each of the internal electrodes 10 adjacent to each other in the second direction D2 are equivalent to each other. That is, the plurality of internal electrodes 7, 8, 9, 10 is arranged at equal intervals in the second direction D2.

The first areas 20A and the second areas 20B are positioned alternately in the second direction D2. Each of the first areas 20A is positioned between a pair of second areas 20B. That is, the pair of second areas 20B sandwiches each of the first areas 20A in the second direction D2.

A width in the second direction D2 of each of the second areas 20B positioned between the pair of internal electrodes 7 included in each of the internal electrode groups 31 is greater than a width in the second direction D2 of each of the second areas 20B positioned between the pair of internal electrodes 7 included in each of the internal electrode groups 33. A width in the second direction D2 of each of the second areas 20B positioned between the pair of internal electrodes 9 included in each of the internal electrode groups 32 is greater than a width in the second direction D2 of each of the second areas 20B positioned between the pair of internal electrodes 9 included in each of the internal electrode groups 34. The width in the second direction D2 of each of the second areas 20B positioned between the pair of internal electrodes 7 included in each of the internal electrode groups 31 and the width in the second direction D2 of each of the second areas 20B positioned between the pair of internal electrodes 9 included in each of the internal electrode groups 32 are equivalent to each other. A width in the second direction D2 of each of the first areas 20A positioned between one internal electrode 7 included in each of the internal electrode groups 31 and one internal electrode 9 included in each of the internal electrode groups 32, a width in the second direction D2 of each of the first areas 20A positioned between one internal electrode 7 included in each of the internal electrode groups 33 and one internal electrode 9 included in each of the internal electrode groups 34, the width in the second direction D2 of each of the second areas 20B positioned between the pair of internal electrodes 7 included in each of the internal electrode groups 33, and the width in the second direction D2 of each of the second areas 20B positioned between the pair of internal electrodes 9 included in each of the internal electrode groups 34 are equivalent to each other.

As described above, in the present modification example, the plurality of internal electrode groups 31 and the plurality of internal electrode groups 32 are arranged alternately in the second direction D2. One internal electrode 7 of the three internal electrodes 7, 8 included in each of the internal electrode groups 31 and one internal electrode 9 of the three internal electrodes 9, 10 included in each of the internal electrode groups 32 oppose each other in the second direction D2. As a result, the plurality of first areas 20A that generates capacitance is disposed in each of the outer portions 11B of the element body 3.

Since the three internal electrodes 7, 8 included in each of the internal electrode groups 31 all have the same polarity, each of the second areas 20B positioned between the pair of internal electrodes 7 respectively positioned at both ends in the second direction D2 of the three internal electrodes 7, 8 does not generate capacitance. Since the three internal electrodes 9, 10 included in each of the internal electrode groups 32 all have the same polarity, each of the second areas 20B positioned between the pair of internal electrodes 9 respectively positioned at both ends in the second direction D2 of the three internal electrodes 9, 10 does not generates capacitance either. Therefore, in each of the outer portions 11B of the element body 3, the first areas 20A that generate capacitance and the second areas 20B that do not generate capacitance are positioned alternately in the second direction D2.

The plurality of internal electrode groups 33 and the plurality of internal electrode groups 34 are arranged alternately in the second direction D2. One internal electrode 7 of the pair of internal electrodes 7 included in each of the internal electrode groups 33 and one internal electrode 9 of the pair of internal electrodes 9 included in each of the internal electrode groups 34 oppose each other in the second direction D2. As a result, the plurality of first areas 20A that generates capacitance is disposed in the inner portion 11A of the element body 3.

Since the pair of internal electrodes 7 included in each of the internal electrode groups 33 has the same polarity, each of the second areas 20B positioned between the pair of internal electrodes 7 does not generate capacitance, in each of the internal electrode groups 33. Since the pair of internal electrodes 9 included in each of the internal electrode groups 34 has the same polarity, each of the second areas 20B positioned between the pair of internal electrodes 9 does not generate capacitance, in each of the internal electrode groups 34. Therefore, also in the inner portion 11A of the element body 3, the first areas 20A that generates capacitance and the second areas 20B that do not generate capacitance are positioned alternately in the second direction D2.

The element body 3 includes the inner layer portion 11 in which the plurality of internal electrode groups 31, 32, 33, 34 is disposed, and a pair of outer layer portions 12 in which the plurality of internal electrode groups 31, 32, 33, 34 is not disposed. The pair of outer layer portions 12 sandwiches the inner layer portion 11 in the second direction D2. The inner layer portion 11 includes the plurality of first areas 20A that generates capacitance, and the plurality of second areas 20B that does not generate capacitance. Also in the multilayer ceramic capacitor C2, a desired capacitance is secured by the plurality of first areas 20A.

The second areas 20B that do not generate capacitance are included in the inner layer portion 11. For this reason, also in the multilayer ceramic capacitor C2, the inner layer portion 11 is wider, and the outer layer portions 12 are narrower, in comparison with, for example, the following multilayer ceramic capacitor to be compared. In the multilayer ceramic capacitor to be compared, the internal electrodes having different polarities are disposed alternately. The size of the element body of the multilayer ceramic capacitor to be compared is the same as the size of the element body of the multilayer ceramic capacitor C2, and the capacitance of the multilayer ceramic capacitor to be compared is the same as the capacitance of the multilayer ceramic capacitor C2.

In the inner layer portion 11, all internal electrodes 7, 8, 9, 10 are arranged at equal intervals in the second direction D2. For this reason, in the inner layer portion 11, the degree of sintering of the dielectric ceramic is substantially uniform. In the multilayer ceramic capacitor C2, the inner layer portion 11 is wider than that of the above multilayer ceramic capacitor to be compared, that is, the area is wider in which the degree of sintering of the dielectric ceramic is substantially uniform. For this reason, the degree of sintering of the dielectric ceramic in the entire of the element body 3 is stabilized. As a result, also in the multilayer ceramic capacitor C2, generation of the crack in the element body 3 is suppressed.

From these things, also in the multilayer ceramic capacitor C2, generation of the crack is suppressed while the desired capacitance is secured.

In the present modification example, the number of internal electrodes 7, 8, 9, 10 is "three" that are included in each of the internal electrode groups 31, 32 positioned in the outer portions 11B of the element body 3, and the number of internal electrodes 7, 9 is "two" that are included in each of the internal electrode groups 33, 34 positioned in the inner portion 11A of the element body 3. The number of internal electrodes 7, 8, 9, 10 included in each of the internal electrode groups 31, 32 positioned in the outer portions 11B is greater than the number of internal electrodes 7, 9 included in each of the internal electrode groups 33, 34 positioned in the inner portion 11A. Therefore, in a case in which a crack is generated in the outer portions 11B of the element body 3, the crack hardly reaches the internal electrodes 7, 9 that have different polarities from each other and contribute capacitance.

In the present modification example, the number of internal electrodes 7, 8, 9, 10 included in each of the internal electrode groups 31, 32 may be "four" or greater. The number of internal electrodes 7, 9 included in each of the internal electrode groups 33, 34 may be "three" or greater.

The embodiment of the present invention has been described above; however, the present invention is not necessarily limited to the embodiment described above, and can be variously modified without departing from the gist thereof.

In the embodiment and the modification example, the multilayer ceramic capacitors C1, C2 have been described as examples of the electronic component; however, the application range of the present invention is not limited to the multilayer ceramic capacitor. The present invention can also be applied to a multilayer electronic component such as a multilayer inductor, a multilayer varistor, a multilayer piezoelectric actuator, a multilayer thermistor, or a multilayer composite component, or an electronic component other than the multilayer electronic component.

What is claimed is:
1. An electronic component comprising:
an element body having a first principal surface and a second principal surface opposing each other in a first direction;
a first terminal electrode disposed on the first principal surface side of the element body; and
a second terminal electrode disposed on the second principal surface side of the element body, wherein:
the first terminal electrode includes:
a first sintered metal layer formed on the first principal surface; and
a first plating layer formed on the first sintered metal layer and including a first base metal;
the second terminal electrode includes:
a second sintered metal layer formed on the second principal surface;
a second plating layer formed on the second sintered metal layer and including a second base metal; and
a solder layer formed on the second plating layer and including Sn and a metal having a higher melting point than the melting point of Sn;
the second base metal can be the same as or different from the first base metal; and
the first plating layer consists of a Ni plating layer that is an outermost layer of the first terminal electrode.
2. The electronic component according to claim 1, wherein
the metal having a higher melting point than the melting point of Sn is Sb.

3. The electronic component according to claim 1, further comprising
a plurality of internal electrodes arranged at equal intervals in a second direction perpendicular to the first direction to oppose each other, inside the element body, wherein
the plurality of internal electrodes includes:
a plurality of first internal electrodes connected to the first terminal electrode and not connected to the second terminal electrode;
a plurality of second internal electrodes connected to the second terminal electrode and not connected to the first terminal electrode;
a plurality of third internal electrodes not connected to at least the second terminal electrode; and
a plurality of fourth internal electrodes not connected to at least the first terminal electrode, and
the element body includes:
a plurality of first areas each of which is positioned between each of the first internal electrodes and each of the second internal electrodes opposing each other; and
a plurality of second areas each of which is positioned between the first internal electrodes opposing each other via each of the third internal electrodes and between the second internal electrodes opposing each other via each of the fourth internal electrodes, and
each of the first areas and each of the second areas are positioned alternately in the second direction.

4. The electronic component according to claim 1, further comprising:
a plurality of first internal electrode groups including a first number of the first internal electrodes connected to the first terminal electrode and arranged in the second direction perpendicular to the first direction inside the element body;
a plurality of second internal electrode groups including the first number of the second internal electrodes connected to the second terminal electrode and arranged in the second direction inside the element body;
a plurality of third internal electrode groups including a second number of the first internal electrodes connected to the first terminal electrode and arranged in the second direction inside the element body; and
a plurality of fourth internal electrode groups including the second number of the second internal electrodes connected to the second terminal electrode and arranged in the second direction inside the element body, wherein
the first number and the second number are integers of two or greater that are different from each other,
the element body includes an inner portion, and a pair of outer portions positioned to sandwich the inner portion in the second direction,
an interval in the second direction between the first internal electrodes included in each of the first internal electrode groups, an interval in the second direction between the second internal electrodes included in each of the second internal electrode groups, an interval in the second direction between each of the first internal electrodes included in each of the first internal electrode groups and each of the second internal electrodes included in each of the second internal electrode groups, an interval in the second direction between the first internal electrodes included in each of the third internal electrode groups, an interval in the second direction between the second internal electrodes included in each of the fourth internal electrode groups, and an interval in the second direction between each of the first internal electrodes included in each of the third internal electrode groups and each of the second internal electrodes included in each of the fourth internal electrode groups are equivalent to each other,
each of the first internal electrode groups and each of the second internal electrode groups are positioned in the pair of outer portions, and are arranged alternately in the second direction in such a manner that one first internal electrode of the first number of the first internal electrodes included in each of the first internal electrode groups and one second internal electrode of the first number of the second internal electrodes included in each of the second internal electrode groups oppose each other in the second direction,
each of the third internal electrode groups and each of the fourth internal electrode groups are positioned in the inner portion, and are arranged alternately in the second direction in such a manner that one first internal electrode of the second number of the first internal electrodes included in each of the third internal electrode groups and one second internal electrode of the second number of the second internal electrodes included in each of the fourth internal electrode groups oppose each other in the second direction.

5. An electronic component comprising:
an element body having a first principal surface and a second principal surface opposing each other in a first direction;
a first terminal electrode disposed on the first principal surface side of the element body; and
a second terminal electrode disposed on the second principal surface side of the element body, wherein:
the first terminal electrode includes:
a first sintered metal layer formed on the first principal surface; and
a first plating layer formed on the first sintered metal layer and including a first base metal;
the second terminal electrode includes:
a second sintered metal layer formed on the second principal surface;
a second plating layer formed on the second sintered metal layer and including a second base metal; and
a solder layer formed on the second plating layer and including Sn and a metal having a higher melting point than the melting point of Sn;
the second base metal can be the same as or different from the first base metal;
a depression is formed in an inner area when viewed from a direction perpendicular to the second principal surface, on an electrode structure including the second sintered metal layer and the second plating layer, and
the solder layer is formed convexly on the depression.

6. An electronic component comprising:
an element body having a first principal surface and a second principal surface opposing each other in a first direction;
a first terminal electrode disposed on the first principal surface side of the element body; and
a second terminal electrode disposed on the second principal surface side of the element body, wherein:
the first terminal electrode includes:
a first sintered metal layer formed on the first principal surface; and
a first plating layer formed on the first sintered metal layer and including a first base metal;
the second terminal electrode includes:

a second sintered metal layer formed on the second principal surface;
a second plating layer formed on the second sintered metal layer and including a second base metal; and
a solder layer formed on the second plating layer and including Sn and a metal having a higher melting point than the melting point of Sn;
the second base metal can be the same as or different from the first base metal;
the second plating layer is a Ni plating layer, and
there is an area in which an alloy of Ni and Sn exists, between the second plating layer and the solder layer.

7. An electronic component comprising:
an element body having a first principal surface and a second principal surface opposing each other in a first direction;
a first terminal electrode disposed on the first principal surface side of the element body;
a second terminal electrode disposed on the second principal surface side of the element body;
a plurality of first internal electrode groups including a first number of the first internal electrodes connected to the first terminal electrode and arranged in the second direction perpendicular to the first direction inside the element body;
a plurality of second internal electrode groups including the first number of the second internal electrodes connected to the second terminal electrode and arranged in the second direction inside the element body;
a plurality of third internal electrode groups including a second number of the first internal electrodes connected to the first terminal electrode and arranged in the second direction inside the element body; and
a plurality of fourth internal electrode groups including the second number of the second internal electrodes connected to the second terminal electrode and arranged in the second direction inside the element body; wherein:
the first terminal electrode includes:
a first sintered metal layer formed on the first principal surface; and
a first plating layer formed on the first sintered metal layer and including a first base metal;
the second terminal electrode includes:
a second sintered metal layer formed on the second principal surface;
a second plating layer formed on the second sintered metal layer and including a second base metal; and
a solder layer formed on the second plating layer and including Sn and a metal having a higher melting point than the melting point of Sn;
the second base metal can be the same as or different from the first base metal;
the first number and the second number are integers of two or greater that are different from each other;
the element body includes an inner portion, and a pair of outer portions positioned to sandwich the inner portion in the second direction;
an interval in the second direction between the first internal electrodes included in each of the first internal electrode groups, an interval in the second direction between the second internal electrodes included in each of the second internal electrode groups, an interval in the second direction between each of the first internal electrodes included in each of the first internal electrode groups and each of the second internal electrodes included in each of the second internal electrode groups, an interval in the second direction between the first internal electrodes included in each of the third internal electrode groups, an interval in the second direction between the second internal electrodes included in each of the fourth internal electrode groups, and an interval in the second direction between each of the first internal electrodes included in each of the third internal electrode groups and each of the second internal electrodes included in each of the fourth internal electrode groups are equivalent to each other;
each of the first internal electrode groups and each of the second internal electrode groups are positioned in the pair of outer portions, and are arranged alternately in the second direction in such a manner that one first internal electrode of the first number of the first internal electrodes included in each of the first internal electrode groups and one second internal electrode of the first number of the second internal electrodes included in each of the second internal electrode groups oppose each other in the second direction;
each of the third internal electrode groups and each of the fourth internal electrode groups are positioned in the inner portion, and are arranged alternately in the second direction in such a manner that one first internal electrode of the second number of the first internal electrodes included in each of the third internal electrode groups and one second internal electrode of the second number of the second internal electrodes included in each of the fourth internal electrode groups oppose each other in the second direction; and
the first number is greater than the second number.

* * * * *